US012718010B1

(12) United States Patent
Liu et al.

(10) Patent No.: US 12,718,010 B1
(45) Date of Patent: Aug. 25, 2026

(54) LANGUAGE MODEL PROCESSING

(71) Applicant: Amazon Technologies, Inc., Seattle, WA (US)

(72) Inventors: Xiaohu Liu, Bellevue, WA (US); Chenlei Guo, Redmond, WA (US); Ruhi Sarikaya, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 124 days.

(21) Appl. No.: 18/621,681

(22) Filed: Mar. 29, 2024

(51) Int. Cl.
*G06F 40/35* (2020.01)
*G06F 40/20* (2020.01)
*G06F 40/56* (2020.01)
*G10L 15/22* (2006.01)

(52) U.S. Cl.
CPC .............. *G06F 40/20* (2020.01); *G06F 40/35* (2020.01); *G06F 40/56* (2020.01); *G10L 15/22* (2013.01)

(58) Field of Classification Search
CPC ... G10L 15/22; G10L 15/1822; G10L 15/183; G10L 15/30; G06F 16/90332; G06F 40/35; G06F 40/295; G06F 40/58; G06F 40/205; G06F 40/216; G06F 40/279; G06F 40/284; G06F 40/40; G06F 40/56
USPC .............................................................. 704/9
See application file for complete search history.

(56) References Cited

U.S. PATENT DOCUMENTS

| | | | | |
|---|---|---|---|---|
| 11,151,986 | B1 * | 10/2021 | Rajbhandari | G10L 15/30 |
| 12,061,970 | B1 * | 8/2024 | Lo | G06N 3/10 |
| 12,254,548 | B1 * | 3/2025 | Datta | G06V 40/176 |
| 12,354,603 | B1 * | 7/2025 | Lee | G06F 40/56 |
| 12,400,652 | B1 * | 8/2025 | Fan | G10L 15/1822 |
| 12,424,210 | B2 * | 9/2025 | Fan | G10L 15/183 |
| 2020/0098351 | A1 * | 3/2020 | Feinstein | G10L 15/005 |
| 2021/0090575 | A1 * | 3/2021 | Mahmood | G10L 17/10 |
| 2023/0042420 | A1 * | 2/2023 | Teng | G10L 15/183 |
| 2024/0126997 | A1 * | 4/2024 | Bent, III | G06Q 30/0242 |
| 2024/0169974 | A1 * | 5/2024 | Bonar | G10L 13/10 |
| 2024/0330279 | A1 * | 10/2024 | Truong | G06F 16/2428 |

* cited by examiner

*Primary Examiner* — Vijay B Chawan
(74) *Attorney, Agent, or Firm* — Pierce Atwood LLP

(57) ABSTRACT

Techniques for using user-provided feedback determined to be included in a user input to generate a revised response to a previous user input and retrain a language model are described. A classifier processes the user input and a corresponding dialog history to determine whether the user input includes user-provided feedback associated with a previous response generated by a first language model. A second language model uses the user input to generate a prompt directing the first language model to generate a revised response to the previous user input that incorporates the user-provided feedback. The previous user input and the revised response are added to a training data set to train the first language model to generate future responses to be associated with the user-provided feedback, without a user having to provide the feedback.

20 Claims, 8 Drawing Sheets

FIG. 1

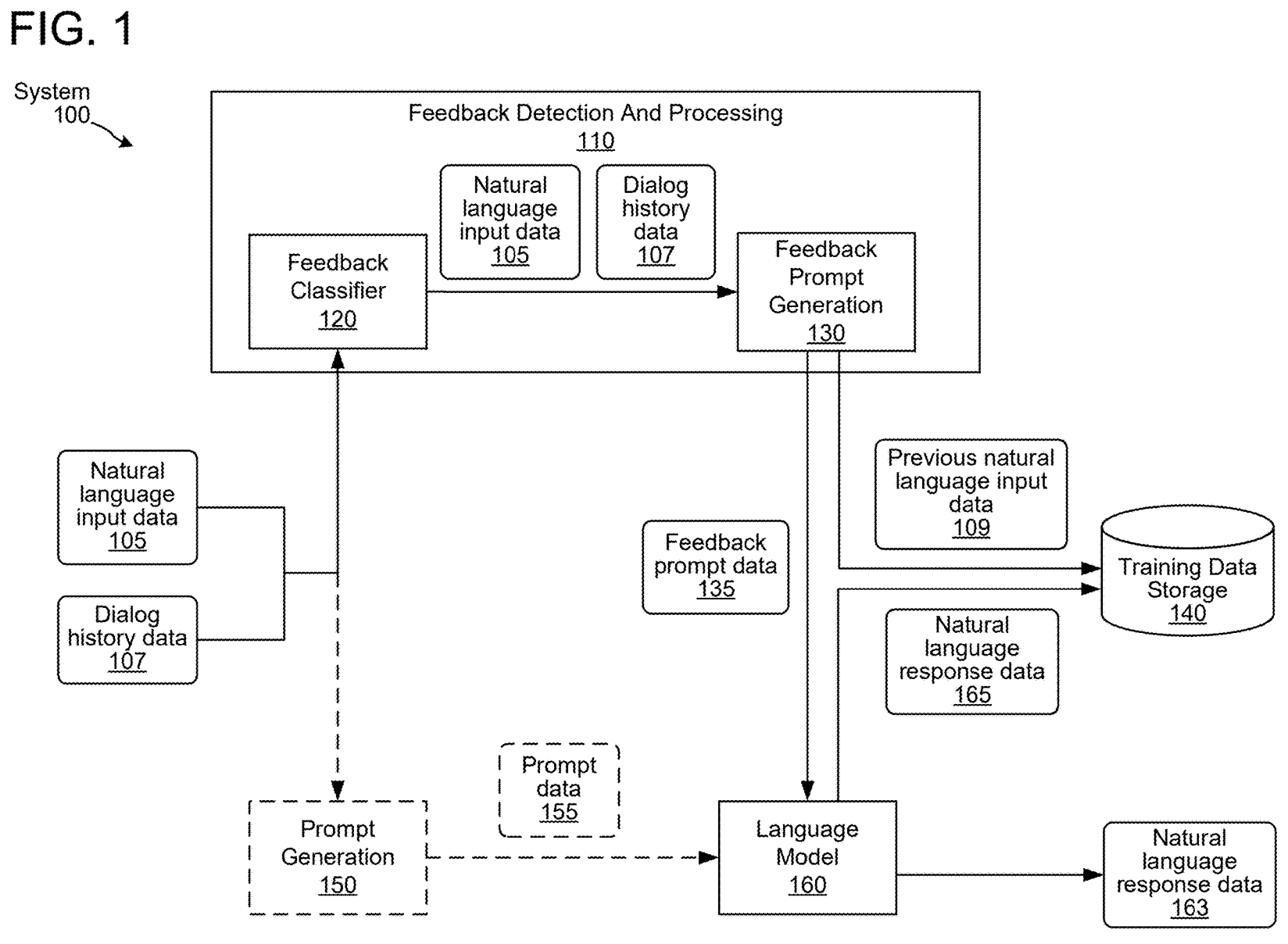

System 100

Feedback Detection And Processing 110

Feedback Classifier 120

Natural language input data 105

Dialog history data 107

Feedback Prompt Generation 130

Previous natural language input data 109

Natural language response data 165

Training Data Storage 140

Feedback prompt data 135

Language Model 160

Natural language response data 163

Prompt data 155

Prompt Generation 150

Natural language input data 105

Dialog history data 107

System 100
Feedback Classifier 120
Natural language input data 105
Dialog history data 107
Feedback Prompt Generation 130
Prompt Generation 210
Prompt data 215
Feedback Prompt Generation Language Model 220
Feedback prompt data 135
Language Model 160
Previous natural language input data 109
Natural language response data 165
Training Data Storage 140
Training data set 225
Language Model Training 230

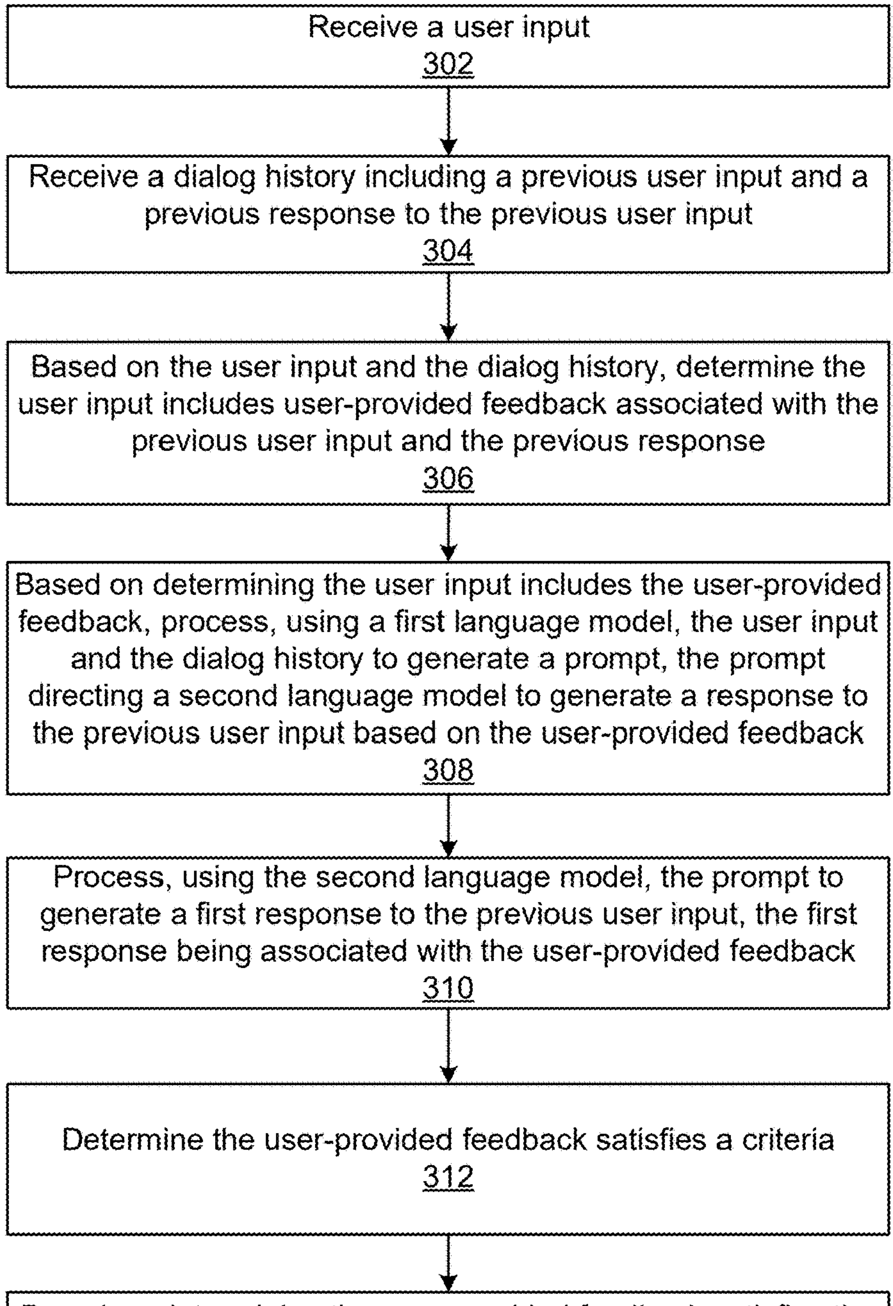
FIG. 3
Receive a user input
302
Receive a dialog history including a previous user input and a previous response to the previous user input
304
Based on the user input and the dialog history, determine the user input includes user-provided feedback associated with the previous user input and the previous response
306
Based on determining the user input includes the user-provided feedback, process, using a first language model, the user input and the dialog history to generate a prompt, the prompt directing a second language model to generate a response to the previous user input based on the user-provided feedback
308
Process, using the second language model, the prompt to generate a first response to the previous user input, the first response being associated with the user-provided feedback
310
Determine the user-provided feedback satisfies a criteria
312
Based on determining the user-provided feedback satisfies the critera and using the previous user input and the first response, perform updating of a first version of the second language model to generate a second version of the second language model, the second version of the second language model configured to generate a second response associated with the user-provided feedback in response to receiving a future user input associated with the previous user input
314

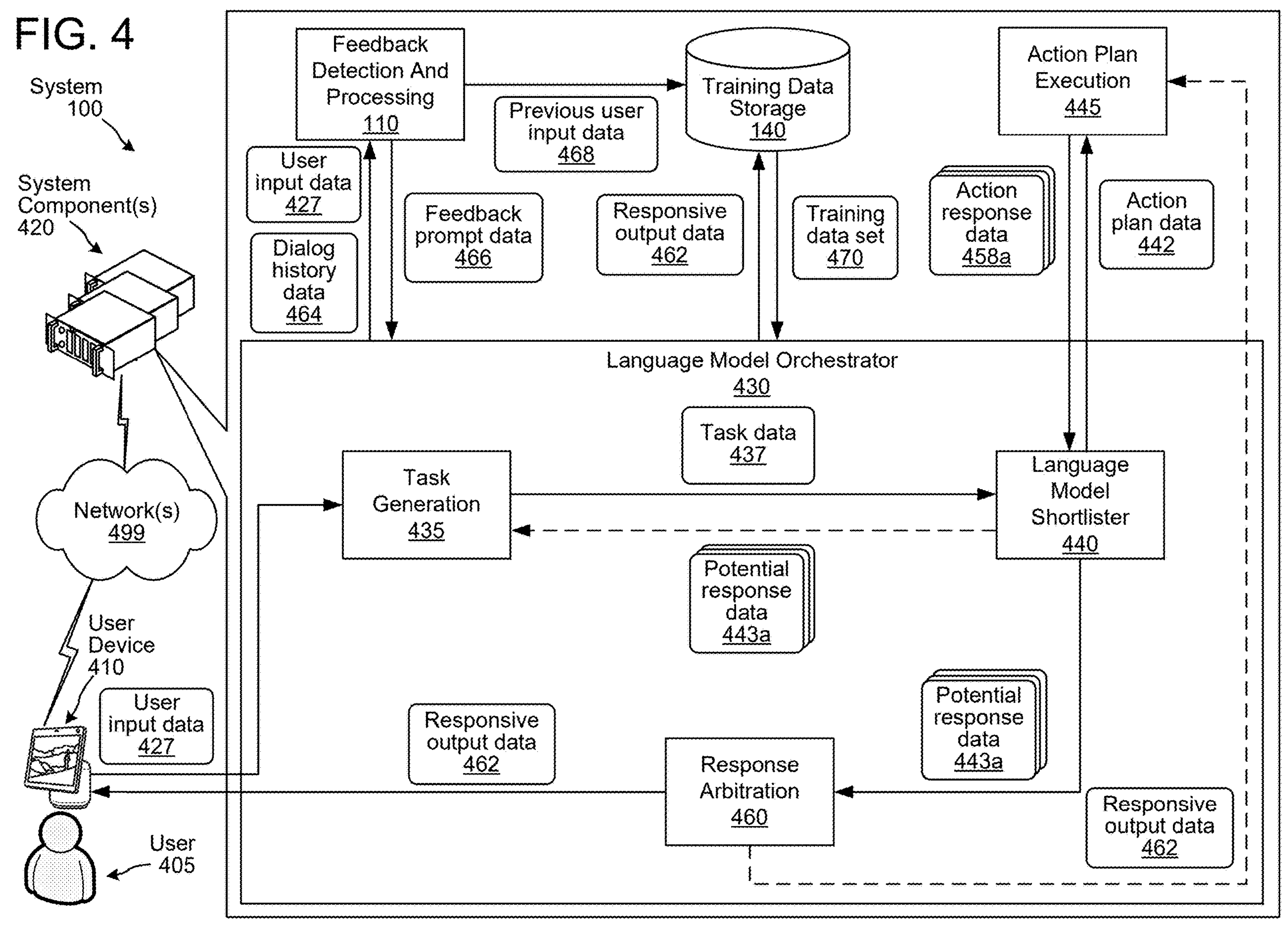
FIG. 4
System 100
System Component(s) 420
Network(s) 499
User Device 410
User 405
User input data 427
Feedback Detection And Processing 110
User input data 427
Dialog history data 464
Previous user input data 468
Feedback prompt data 466
Training Data Storage 140
Responsive output data 462
Training data set 470
Action response data 458a
Action Plan Execution 445
Action plan data 442
Language Model Orchestrator 430
Task data 437
Task Generation 435
Language Model Shortlister 440
Potential response data 443a
Potential response data 443a
Responsive output data 462
Response Arbitration 460
Responsive output data 462

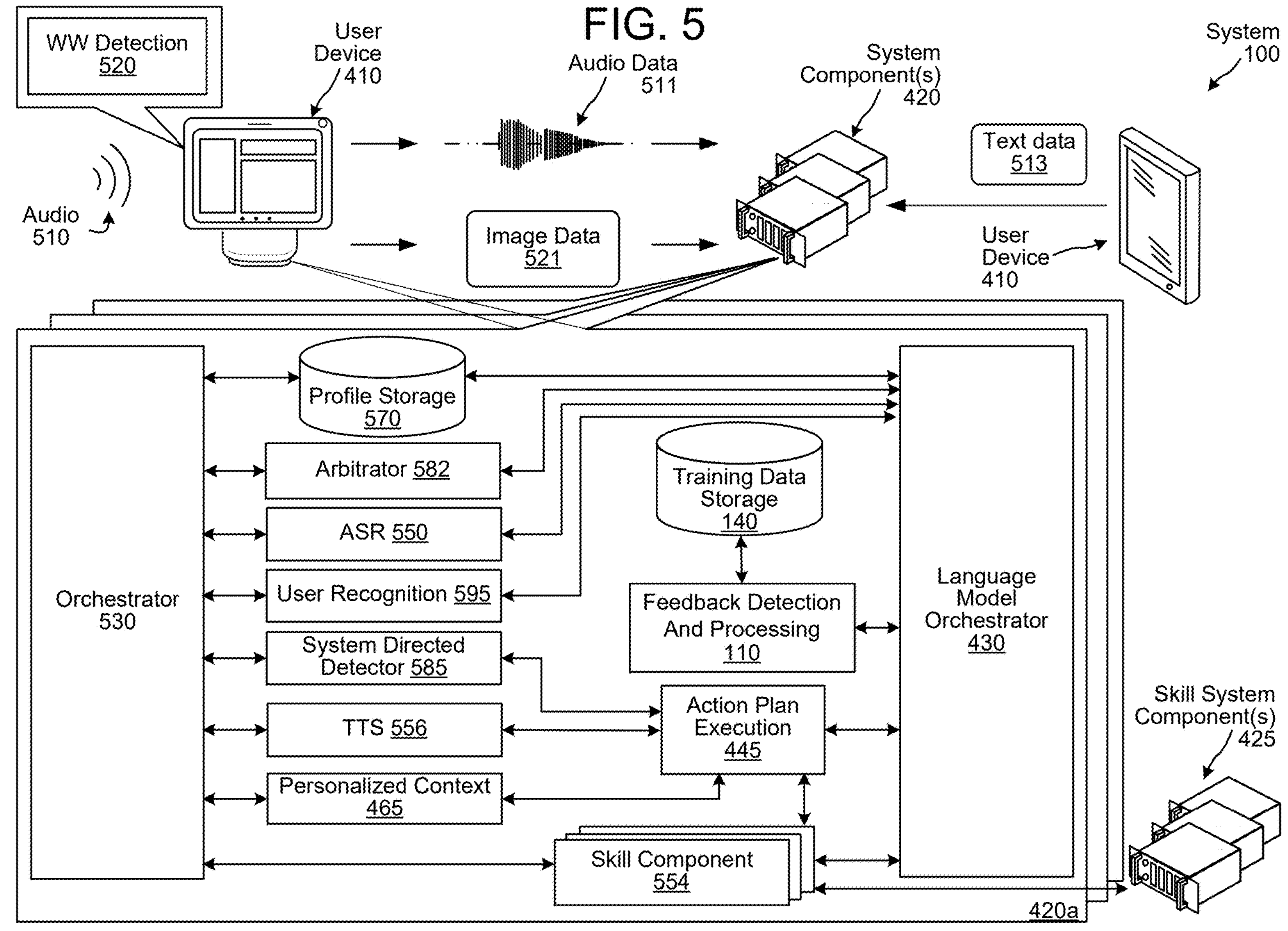
FIG. 5
WW Detection 520
User Device 410
Audio Data 511
System Component(s) 420
System 100
Audio 510
Image Data 521
Text data 513
User Device 410
Profile Storage 570
Arbitrator 582
ASR 550
User Recognition 595
System Directed Detector 585
TTS 556
Personalized Context 465
Orchestrator 530
Training Data Storage 140
Feedback Detection And Processing 110
Action Plan Execution 445
Skill Component 554
Language Model Orchestrator 430
420a
Skill System Component(s) 425

FIG. 6

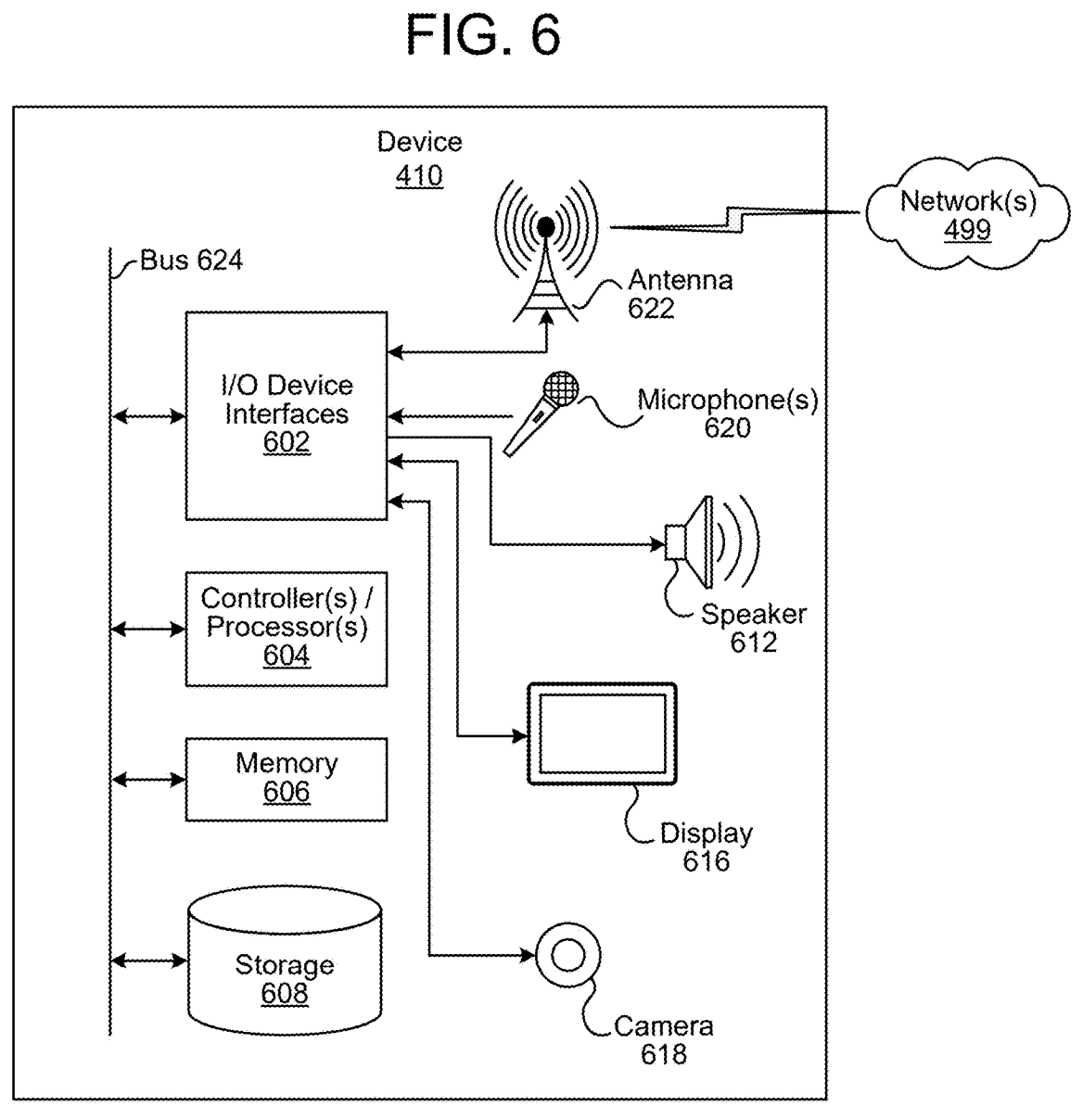

Network(s) 499

Device 410

Antenna 622

Microphone(s) 620

Speaker 612

Display 616

Camera 618

I/O Device Interfaces 602

Controller(s) / Processor(s) 604

Memory 606

Storage 608

Bus 624

FIG. 7

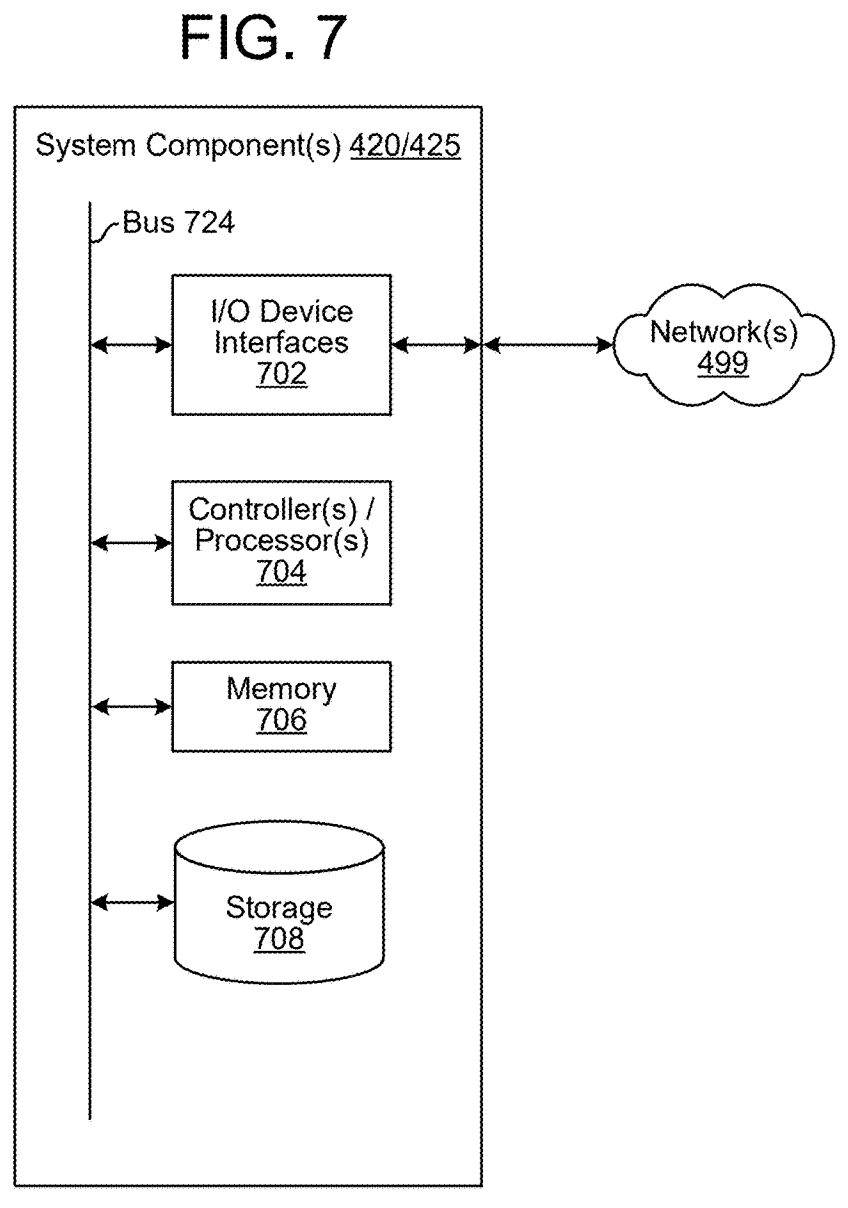

System Component(s) 420/425

Bus 724

Network(s) 499

I/O Device Interfaces 702

Controller(s) / Processor(s) 704

Memory 706

Storage 708

System
Component(s)
420
Skill System
Component(s)
425
Vehicle
410e
Headphones
410m/410n
Microwave
410j
Refrigerator
410i
Smart Phone
410b
Network(s)
499
Smart Watch
410c
Washer/
Dryer
410h
Smart TV
410g
Tablet Computer
410d
Speech-Detection
Device(s) with Display
410f
Speech-Detection
Device(s)
410a
Motile Device
410k

LANGUAGE MODEL PROCESSING

BACKGROUND

Natural language processing systems have progressed to the point where humans can interact with computing devices using their voices and natural language textual input. Such systems employ techniques to identify the words spoken and written by a human user based on the various qualities of received input data. Speech recognition combined with natural language understanding processing techniques enable speech-based user control of computing devices to perform tasks based on the user's spoken inputs. Such processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1 is a conceptual diagram illustrating example components and processing of a system configured to detect and process feedback included in a user input, according to embodiments of the present disclosure.

FIG. 3 is a flowchart illustrating an example process that may be performed by the system to detect and process feedback in a user input, according to embodiments of the present disclosure.

FIG. 4 is a conceptual diagram illustrating further example components and processing of the system, which are configured to determine a response to a user input, according to embodiments of the present disclosure.

FIG. 5 is a conceptual diagram of components of the system, according to embodiments of the present disclosure.

FIG. 6 is a block diagram conceptually illustrating example components of a device, according to embodiments of the present disclosure.

FIG. 7 is a block diagram conceptually illustrating example components of a system, according to embodiments of the present disclosure.

DETAILED DESCRIPTION

Figure 2:
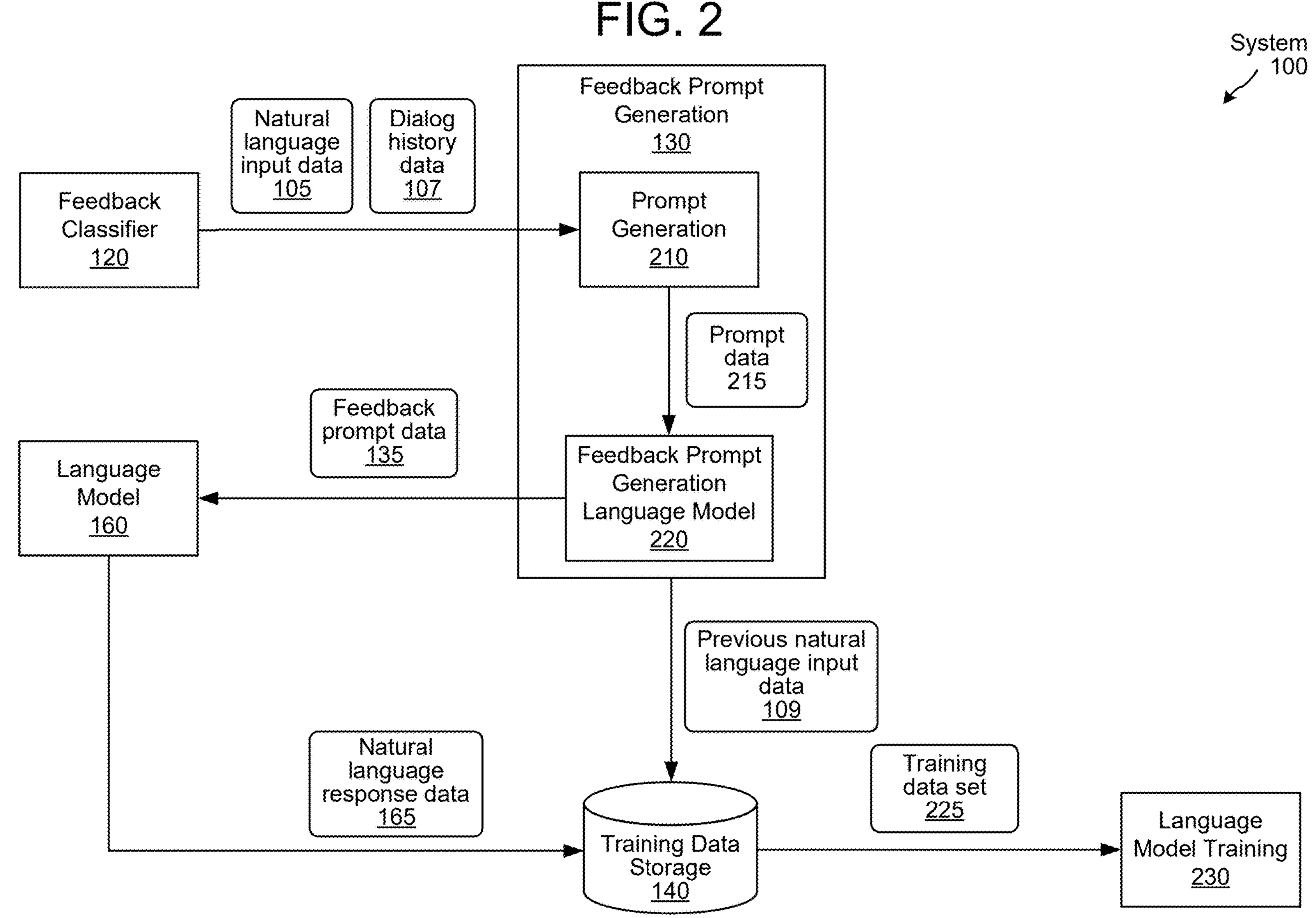
FIG. 2 is a conceptual diagram illustrating example components and processing of the feedback prompt generation component, according to embodiments of the present disclosure.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system. Text-to-speech (TTS) is a field of computer science concerning transforming textual and/or other data into audio data that is synthesized to resemble human speech. Natural language generation (NLG) is a field of artificial intelligence concerned with automatically transforming data into natural language (e.g., English) content. Speech-to-speech is a field of computer science, artificial intelligence, and linguistics in which embedding data is generated to represent speech in audio data and, using one or more models, the embedding data is processed to generate audio data and/or a system command responsive to the speech. Language modeling (LM) is the use of various statistical and probabilistic techniques to determine the probability of a given sequence of words occurring in a sentence. LM can be used to perform various tasks including understanding a natural language input (e.g., when noise is present) and performing generative tasks that involve generating natural language output data.

Certain systems may be configured to respond to natural language (e.g., spoken or typed) user inputs. For example, in response to the user input "what is today's weather," the system may output weather information for the user's geographic location. As another example, in response to the user input "what are today's top stories," the system may output one or more news stories. For further example, in response to the user input "tell me a joke," the system may output a joke to the user. As an additional example, in response to the user input "write code to export a URL from a webpage and saves it in a column of an [application name] file called [identifier]," the system may output computer source code usable for performing the requested action. As a further example, for the user input "make me a video/image of a sunset on Mars with a spaceship landing," the system may output video/image data corresponding to the requested video/image. As an even further example, for the user input "create a musical audio sample that is fun, fast, and happy."

A system may receive a user input as speech from a microphone, image from a camera, text from a keyboard, or any other mechanism. For example, a user may speak an input to a device. The device may send audio data, representing the spoken input, to the system. The system may perform ASR processing on the audio data to generate ASR data (e.g., text data, token data, etc.) representing the user input. The system may perform processing on the ASR data to determine an action responsive to the user input. A system may also receive a natural language user input in the form of text, such as a text input from a computer, phone, or other device.

In some instances, the system may be configured to process input text data (such as ASR data or text entered into a user interface) using one or more language models (e.g., large language models (LLMs)) to determine a response to the user input. For example, in response to a user input of "what is the history of the National Football League," the language model(s) may output a synopsis of the history of the National Football League.

In some instances, a user input received by the system may be user-provided feedback associated with a previously-generated response to a previous user input using the language model(s). For example, in response to a previous user input of "tell me about [subject]," the system may use the language model(s) to generate a response corresponding to a detailed, lengthy explanation of "[subject]". Thereafter, the system may receive a subsequent user input of "that was too long." The subsequent user input, therefore, corresponds to user-provided feedback indicating that the previous response generated by the language model(s) was too long, and further requesting that a shorter response be output by the language model(s). As another example, the user can say, "now draw me a picture of that character" and after seeing the first output of a machine-generate image, follow-up with "now make the cloths this color" while holding something up to the camera.

The present disclosure describes techniques for detecting that a user input includes user-provided feedback and generating a prompt corresponding to the user-provided feedback that is usable to cause the language model(s) to generate a feedback-revised response to the previous user input based on the user-provided feedback. The present disclosure further describes techniques for using the previous user input and the feedback-revised response to further train the language model(s), such that the language model(s) may automatically generate future responses associated with the user-provided feedback in response to receiving similar user inputs, without the user having to again provide the user-provided feedback.

Using the previous example above, if the system determines that a user input of "that was too long" corresponds to a previous system-generated response to the previous user request of "what is the history of the National Football League" the system may process the input data representing "that was too long" into a feedback prompt along the lines of "please respond in under 200 words". The combination of the previous user question of "what is the history of the National Football League" may be associated with the system-generated feedback prompt of "please respond in under 200 words" and the associated data (e.g., the combined previous user request and system-generated feedback prompt) may be stored and used to retrain the response-generating language model so that the updated language model is configured to respond to a request asking for the history of the National Football League using fewer words than what was originally provided to the user in response to the original request. This approach may be taken with a variety of user-provided feedback such as feedback commenting on a system-generated response's length, naturalness, accuracy, comprehensiveness, or other factors.

In some example embodiments, the system may receive a user input including a user request for the system to generate a response and a dialog history, which may include a previously-received user input and a corresponding system-generated response. The system may use a classifier to determine whether the user input includes user-provided feedback, e.g., based on the user input and the dialog history. As used herein, "user-provided feedback" may correspond to a portion of a user input that requests and/or indicates a modification be made to an output previously-generated by the system, whereas a user input that does not include user-provided feedback may correspond to a user input that includes a new user request. For example, user-provided feedback may request/indicate a modification be made to a verbosity (e.g., a length of/number of words included in the response), a naturalness (e.g., whether the response appears to be human-generated), a factual accuracy, and/or a comprehensiveness (e.g., a responsiveness of the response to the user's request) of the previously-generated response.

If the system determines that the user input included user-provided feedback, the system may use a prompt-generating language model to generate a prompt directing the language model that generated the previously-generated response to generate a feedback-revised response to the previous user input. As used herein, a "feedback-revised response" may correspond to a response generated by a language model that is responsive to a previous user input and is generated based on user-provided feedback.

The feedback-revised response may be sent for storage in association with the previous user input. The storage may include a plurality of training data, including feedback-revised responses and associated user inputs. The training data may be used to generate a training data set usable to further train the language model. For example, the training data set may be used to perform supervised fine-tuning of the language model to configure the language model to automatically generate responses associated with the user-provided feedback in response to receiving similar user inputs, without a user having to further provided the corresponding user-provided feedback. In some example embodiments, feedback-revised responses and associated user inputs associated with user-provided feedback determined to satisfy a criteria (e.g., the user-provided feedback associated with the feedback-revised response being associated with a particular confidence/score and/or the user-feedback associated with the feedback-revised response being of a particular type of user-provided feedback, the storage including a particular number of (semantically) similar feedback-revised responses and associated user inputs) are sent for storage and/or used to generate the training data set. For example, user-provided feedback meeting the criteria may indicate that the associated feedback-revised response and associated user input are useful for training of the language model with respect to multiple users' preferences (e.g., the user-provided feedback may be relevant to more than one user (e.g., a household of users, a global set of users, etc.)).

In some example embodiments, the training data may further be stored in association with a user identifier (ID) associated with the user that provided the user input and the user-provided feedback that resulted in the generated of the feedback-revised response. In some such example embodiments, the training data set retrieved from the storage may be associated with the particular user, such that the training of the language model may result in the language model being configured to automatically generate responses associated with the user-provided feedback in response to receiving similar user inputs from the particular user, without the user having to further provide the feedback. In some example embodiments, feedback-revised responses and associated user inputs associated with user-provided feedback determined to not satisfy the criteria are sent to storage and/or used to generate the training data set associated with the particular user. For example, user-provided feedback not meeting the criteria may indicate that the associated feedback-revised response and associated user input may be useful for training of a language model with respect to the particular user's preferences (e.g., the user-provided feedback may be relevant to just the particular user), rather than multiple user's preferences. In some such example embodiments, the training data may be used as an exemplar for performing few-shot learning by a language model during processing of a future, similar user input.

Teachings of the present disclosure provide, among other things, improved computer processing for language model-based systems by enabling the system to detect when a user input includes user-provided feedback and generate a prompt usable to cause a language model to generate a feedback-revised to a previous user input associated with the user-provided feedback based on the user-provided feedback. This can result in improved computer processing by enabling the systems to cause a language model to generate a revised response to a user input that incorporates user-provided feedback determined to be included in a subsequent user input. This can result in further improved computer processing by enabling the system to generate training data sets from the original user inputs and the feedback-revised responses to further train the language models to automatically generate responses associated with previously-received user-provided feedback without the user having to further provide the feedback.

A system according to the present disclosure will ordinarily be configured to incorporate user permissions and only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

Language modeling is the use of various statistical and probabilistic techniques to determine the probability of a given sequence of words occurring in a sentence. Language models analyze bodies of text data to provide a basis for their word predictions. The language models are generative models. In some embodiments, one or more of the language models may be a large language model (LLM). A language model (e.g., LLM) is an advanced artificial intelligence system designed to process, understand, and generate human-like text based on relatively large amounts of data. In some embodiments, a language model (or another type of generative model) may be further designed to process, understand, and/or generate multi-modal data including audio, text, image, and/or video. A language model may be built using deep learning techniques, such as neural networks, and may be trained on extensive datasets that include text (or other type of data, such as multi-modal data including text, audio, image, video, etc.) from a broad range of sources, such as old/permitted books and websites, for natural language processing. An LLM uses an expansive training dataset, as compared to a relatively smaller language model, and can include a relatively large number of parameters (in the range of billions, trillions or more), hence, they are called "large" language models. In some embodiments one or more of the language models (and their corresponding operations, discussed herein) may be the same language model.

An artificial intelligence (AI) system may use ASR, NLU, NLG, and/or TTS, each with and/or without a language model, for processing user inputs, including natural language inputs (e.g., typed and spoken inputs).

In some embodiments (e.g., where one or more of the language models are LLMs), the language model(s) may be transformer-based seq2seq models involving an encoder-decoder architecture. In an encoder-decoder architecture, the encoder may produce a representation of an input (e.g., audio, text, image, video, etc.) using a bidirectional encoding, and the decoder may use that representation to perform some task. In some such embodiments, one or more of the language models may be a multilingual (approximately) 20 billion parameter seq2seq model that is pre-trained on a combination of denoising and Causal Language Model (CLM) tasks in various languages (e.g., English, French, German, Arabic, Hindi, Italian, Japanese, Spanish, etc.), and the language model may be pre-trained for approximately 1 trillion tokens. Being trained on CLM tasks, the language model(s) may be capable of in-context learning. Examples of such language models include some of the Amazon Alexa and AWS Titan family of generative models.

In other embodiments (e.g., where one or more of the language models are an LLM), the language model(s) may be a decoder-only architecture. The decoder-only architecture may use left-to-right (unidirectional) encoding of the input (e.g., audio, text, image, video, etc.). Examples of such language models include some of the Amazon Alexa and AWS Titan family of generative models as well as the Generative Pre-trained Transformer 3 (GPT-3) and other versions of GPT. GPT-3 has reportedly a capacity of (approximately) 175 billion machine learning parameters.

Other examples of language models (e.g., LLMs) include BigScience Large Open-science Open-access Multilingual Language Model (BLOOM), Language Model for Dialogue Applications model (LaMDA), Bard, Large Language Model Meta AI (LLaMA), etc.

In some embodiments, the system may include one or more machine learning models instead of or in addition to the language model(s). Such machine learning model(s) may receive text and/or other types of data as inputs (e.g., audio, image, video, etc.), and may output text and/or the other types of data. Such model(s) may be neural network-based models, deep learning models, classifier models, autoregressive models, seq2seq models, etc.

In some embodiments (e.g., where the language model(s) is an LLM), the input to the language model may be in the form of a prompt. A prompt may be a natural language input, for example, a directive or request, for the language model to generate an output according to the prompt. The output generated by the language model may be a natural language output responsive to the prompt. In some embodiments, the output may additionally or instead be another type of data, such as audio, image, video, etc. The prompt and the output may be text in a particular language (e.g., English, Spanish, German, etc.). For example, for an example prompt "how do I cook rice?", the language model may output a recipe (e.g., a step-by-step process represented by text, audio, image, video, etc.) to cook rice. As another example, for an example prompt "I am hungry. What restaurants in the area are open?", the language model may output a list of restaurants near the user 405 that are open at the time of the user prompt.

The language models may be configured using various learning techniques. For example, in some embodiments, the language models may be configured using few-shot learning. In few-shot learning, the model learns how to learn to solve the given problem. In this approach, the model is provided with (e.g., in the prompt) a limited number of examples/exemplars (i.e., "few shots") from the new task, and the model uses this information to adapt and perform well on that task. Few-shot learning may require fewer amount of training data than implementing other fine-tuning techniques. For further example, in some embodiments, the language models may be configured using one-shot learning, which is similar to few-shot learning, except the model is provided with a single example (e.g., in the prompt). As another example, in some embodiments, the language models may be configured using zero-shot learning. In zero-shot learning, the model solves the given problem without examples of how to solve the specific/similar problem and just based on the model's training dataset. In this approach, the model is provided with data not observed during training, and the model learns to generate an appropriate output based on its learning of other data.

FIG. 1 illustrates a system 100 configured to detect and process feedback in a user input. As shown in FIG. 1, the system 100 may include a feedback detection and processing component 110, a training data storage 140, a prompt generation component 150, and a language model 160. As further shown in FIG. 1, the feedback detection and processing component 110 may include a feedback classifier 120, and a feedback prompt generation component 130. In some embodiments, the language model 160 may correspond to one or more of the language models/LLMs discussed herein in connection with FIG. 4. For example, the language model 160 may correspond to a language model orchestrator component 430, a task generation component 435, a language model shortlister component 440, and/or a response arbitration component 460, as is discussed in detail herein in connection with FIG. 4.

As illustrated in FIG. 1, natural language input data 105 is received at the feedback classifier 120 of the feedback detection and processing component 110 and the prompt generation component 150. The natural language input data 105 may correspond to a user-provided input, such as text (e.g., a text or tokenized representation of a user input, which may be provided by the user/output by a component of the system (e.g., an ASR component 550)). For example, the natural language input data 105 may correspond to a user input of "Tell me about [subject]." For further example, as discussed herein, in some embodiments, the natural language input data 105 may include user-provided feedback associated with a response previously generated by the system 100, such as "That was too long."

As further illustrated in FIG. 1, dialog history data 107 is also received at the feedback classifier 120 and the prompt generation component 150. The dialog history data 107 may represent one or more user inputs and corresponding system-generated responses for a current interaction or past interaction(s) between the user and the system 100 (e.g., for a current dialog). As used herein, a "dialog" may refer to multiple related user inputs and system 100 outputs (e.g., through user device(s) 410) between the system and the user that may have originated with a single user input initiating the dialog. Thus, the data associated with a dialog may be associated with a same dialog identifier, which may be used by components of the overall system 100 to associate information across the dialog. Subsequent user inputs of the same dialog may or may not start with the user speaking a wakeword. Each natural language input may be associated with a different natural language input identifier, and each natural language input identifier may be associated with a corresponding dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The prompt generation component 150 may process the natural language input data 105 and, optionally, the dialog history data 107 to generate prompt data 155 representing a prompt for input to the language model 160. In some embodiments, the prompt data 155 may be a directive for the language model 160 to generate an output responsive to the natural language input data 105 (e.g., the natural language response data 165) given the other information (e.g., the dialog history data 107) included in the prompt data 155. For example, for the natural language user input of "tell me about [subject]," the prompt data 155 may correspond to "generate a response that satisfies the user's request of: 'tell me about [subject]'." In some embodiments, the prompt generation component 150 may also include in the prompt data 155 a directive to output a response that satisfies certain conditions. Such conditions may relate to generating a response that is unbiased (toward protected classes, such as gender, race, age, etc.), non-harmful, profanity-free, etc. For example, the prompt data 155 may include "Please generate a polite, respectful, and safe response and one that does not violate protected class policy."

In some embodiments, the prompt generation component 150 may also include in the prompt data 155 a sample processing format to be used by the language model 160 when processing the prompt. In some embodiments, the prompt generation component 150 may generate the prompt data 155 according to a template format. In some embodiments, the template format may direct the language model 160 as to how it should process to generate the response to the user input. In some embodiments, the format may further include an indication, such as a label of "User:" indicating that the following string of characters/tokens are the user input. In some embodiments, the format may further include a label of "Thought:" directing the language model 160 to generate an output representing the determined interpretation of the user input by the language model 160 and/or an action that should be taken (e.g., the user is requesting [intent of the user input], the user is trying to [intent of the user input], need to determine [information needed to properly process the user input], etc.). In some embodiments, the format may further include an indication of "Observation:" indicating the following string of characters/tokens as the result of performance of an action determined by the language model 160/the language model 160's interpretation of the result of the performance of the action determined by the language model 160 (e.g., the completed tasks and/or their potential responses). In some embodiments, the format may further include an indication of "Response:" directing the language model 160 to generate a response to the prompt.

The language model 160 may be a machine learning (ML) model (e.g., a generative model, such as one or more of the Amazon family of generative models, a generative pre-trained transformer (GPT) model, a Bidirectional Encoded Representations for Transformers (BERT) model, or any other transformer-based model). More specifically, the language model 160 may be configured to process the prompt data 155 to generate output data corresponding to a response to the natural language input data 105. In some embodiments, the language model 160 may be configured to generate natural language text/tokens responsive to a user input. For example, for the natural language input data 105 "tell me about [subject]," the natural language response data 163 may correspond to a summary of "[subject]." For further example, for the natural language input data 105 "write me code to [action description]," the natural language response data 163 may be computer source code usable to perform "[action description]." In some embodiments, the language model may be configured to generate audio output data. For example, for the natural language input data 105 "create a musical beat that is slow, rhythmic, and groovy," the language model 160 may generate audio output data corresponding to a musical beat having the request characteristics. In some embodiments, the language model 160 may be configured to generate image output data. For example, for the natural language input data 105 "draw me an image of a rabbit that is the size of a house," the language model 160 may generation image output data corresponding to the requested image. In some embodiments, the language model 160 may be configured to generate video output data. For example, for the natural language input data 105 "create a short video of a monkey surfing while eating a banana," the language model 160 may generate video output data corresponding to the requested short video.

The natural language response data 163 may be sent to one or more components of the system 100, as discussed in more detail herein in connection with FIG. 4. For example, the natural language response data 163 may be sent to a user device 410 associated with a user 405 that provided the user input corresponding to the natural language input data 105. For further example, the natural language response data 163 may be sent to a TTS component 556 and/or a visual output generation component to generate synthetic speech and/or visual output data corresponding to the natural language response data 163. The synthetic speech and/or visual output data may be sent to the user device 410 to be presented to the user 405.

The feedback classifier 120 may be configured to detect feedback included in a user input. In other words, for the natural language input data 105, the feedback classifier 120 may determine whether the natural language input data 105 corresponds to/includes user-provided feedback to a response previously generated by the system 100 (e.g., by a language model of the system 100, such as by the language model 160 and/or one or more of the language models discussed herein below in connection with FIG. 4). For example, for the natural language input data 105 corresponding to "tell me about [subject]," the feedback classifier 120 may process to determine that the natural language input data 105 does not include user-provided feedback and, rather, corresponds to a user input including a new user request. In contrast, for example, for the natural language input data 105 corresponding to "That was too long," the feedback classifier 120 may process to determine that the natural language input data 105 includes user-provided feedback associated with a previous system-generated response to a previous input.

User-provided feedback may correspond to a portion of a user input that corresponds to a request for and/or an indication of a modification to be made to an output previously-generated by the system 100 (e.g., the language model 160 and/or one or more of language models discussed herein in connection with FIG. 4). In some embodiments, for example, user-provided feedback may be associated with a verbosity of a previously-generated response. For example, natural language input data 105*a* corresponding to "That was too long" may correspond to user-provided feedback requesting that the system 100 shorten a previously-generated response/output a response that is shorter than a previously-generated response. In some embodiments, for further example, user-provided feedback may be associated with a naturalness or complexity of a previously-generated response. For example, natural language input data 105*b* corresponding to "explain it in more simply" or "this doesn't sound natural" may correspond to user-feedback indicating that a previously-generated response was too complicated or unnaturally worded and requesting generation of a response using simpler terms or more natural wording. In some embodiments, as another example, user-provided feedback may be associated with a factual accuracy of the previously-generated response. For example, natural language input data 105*c* corresponding to "I didn't mention [entity]" or "I don't think that's correct" may correspond to user-feedback indicating that a previously-generated response may have included factually inaccurate/irrelevant information (e.g., as a result of a hallucination by the language model 160) and requesting generation of a factually accurate/relevant response. In some embodiments, as an even further example, user-provided feedback may be associated with a comprehensiveness of a previously-generated response. For example, natural language input data 105*d* corresponding to "that didn't answer my question" or "explain more" may correspond to user-feedback indicating that a previously-generated response wasn't responsive to the user's original request and requesting a response be generated that is responsive to the user's original request.

In some embodiments, the feedback classifier 120 may implement a ML model (e.g., a classifier or a generative model, such as one or more of the Amazon family of generative models, a GPT model, a BERT model, or any other transformer-based model). For example, for a given input (and corresponding dialog history), the ML model may be configured to classify the input as including user-provided feedback or not. In some such embodiments, the ML model may be trained using a corpus of labeled/annotated information including positive and negative examples of user-provided feedback (e.g., a corpus of inputs that include user-provided feedback and inputs that do not include user-provided feedback). During training, given an example user input, the ML model may be tasked with predicting whether the example user input includes user-provided feedback. The ML model's prediction may be compared with a label/annotation representing whether the example user input actually includes user-provided feedback or not. Based on the comparison, one or more parameters (e.g., weights) of the ML model may be adjusted accordingly.

In some embodiments, the feedback classifier 120 may be further configured to determine a type of user-provided feedback (e.g., verbosity, naturalness, accuracy, comprehensiveness, etc.) associated with an input (e.g., the natural language input data 105). For example, the feedback classifier 120 may determine an indication (e.g., a label, a confidence/score) of the type of user-provided feedback associated with the natural language input data 105 and may further send the indication to the feedback prompt generation component 130.

In some embodiments, the feedback classifier 120/the feedback detection and processing component 110 may be configured to interact with a storage (e.g., referred to herein as a feedback storage (not illustrated)) to determine whether the natural language input data 105 includes user-provided feedback. For example, the feedback storage may include a plurality of natural language inputs determined to include user-provided feedback and optionally, associated dialog histories. The feedback classifier 120/the feedback detection and processing component 110 may query the feedback storage using the natural language input data 105 and, optionally, the dialog history data 107 (or an encoded/hashed representation thereof) to determine whether natural language input data corresponding to/semantically similar (e.g., based on the encoded representation of the natural language input data 105)/contextually similar (e.g., based on the natural language input data 105 and the dialog history data 107) to the natural language input data 105 has previously been determined to include user-provided feedback.

If the natural language input data 105 is determined to correspond/be semantically similar/be contextually similar to a natural language input included in the feedback storage, then the natural language input data 105 may be determined to include user-provided feedback, and the natural language input data and the dialog history data 107 may be sent to the feedback prompt generation component 130. In some embodiments, based thereon, the natural language input data 105 and, optionally, the dialog history data 107 may be sent to the feedback storage. If the natural language input data 105 is determined to not correspond/be semantically similar/be contextually similar to a natural language input included in the feedback storage, then the feedback classifier 120 may process as described herein to determine whether the natural language input data 105 includes user-provided feedback.

If the feedback classifier 120 determines that the natural language input data 105 includes user-provided feedback, the natural language input data and the dialog history data 107 may be sent to the feedback prompt generation component 130. If the feedback classifier 120 determines that the natural language input data 105 does not include user-provided feedback, then the processing of the feedback detection and processing component 110 may cease.

The feedback prompt generation component 130 may be configured to transform the user-provided feedback into a prompt usable to generate a feedback-revised response to the original user request, which may correspond to a response to the original user input, to which the user-provided feedback is related, that is generated based on user-provided feedback. In other words, for the natural language input data 105 and, optionally, the dialog history data 107, the feedback prompt generation component 130 may generate feedback prompt data 135 corresponding to a directive for a language model (e.g., the language model that generated the previously-generated response to which the user-feedback is directed, such as the language model 160) to generate a response to the original user input, based on the user-provided feedback. Further details regarding the processing of the feedback prompt generation component 130 are discussed herein in connection with FIG. 2.

For example, for natural language input data 105*a* corresponding to "That was too long" and dialog history data 107*a* corresponding to previous natural language input data 105*b* corresponding to "tell me about [subject]" and previously-generated natural language response data 165*a* corresponding to a summary of "[subject]," the feedback prompt generation component 130 may generate feedback prompt data 135*a* corresponding to "Make the response brief," "tell me about [subject]. Make the response brief," or the like, which is meant to elicit generation of natural language response data 165*b* by a language model (e.g., the language model 160) that is responsive to the previous natural language input data 105*b* and is in compliance with/generated according to the user-provided feedback included in the natural language input data 105*a* (e.g., natural language response data 165*b* corresponding to a shorter summary of "[subject]").

For further example, for natural language input data 105*c* corresponding to "That didn't answer my question" and dialog history data 107*b* corresponding to previous natural language input data 105*d* corresponding to "which team won last week's game" and previously-generated natural language response data 165*c* corresponding to "last week's game was between [team 1 name] and [team 2 name]," the feedback prompt generation component 130 may generate feedback prompt data 135*b* corresponding to "Make the response comprehensive," "which team won last week's game. Make the response comprehensive," or the like, which is meant to elicit generation of natural language response data 165*b* by a language model (e.g., the language model 160) that is responsive to the previous natural language input data 105*d* and is in compliance with/generated according to the user-provided feedback included in the natural language input data 105*c* (e.g., natural language response data 165*d* corresponding to exactly which team won last week's game).

As another example, for natural language input data 105*e* corresponding to "That doesn't sound natural" and dialog history data 107*c* corresponding to previous natural language input data 105*f* corresponding to "give me an example speech for [event]" and previously-generated natural language response data 165*e* corresponding to the requested speech, the feedback prompt generation component 130 may generate feedback prompt data 135*c* corresponding to "Make it sound natural," "give me an example speech for [event]. Make it sound natural." or the like, which is meant to elicit generation of natural language response data 165*h* by a language model (e.g., the language model 160) that is responsive to the previous natural language input data 105*g* and is in compliance with/generated according to the user-provided feedback included in the natural language input data 105*f* (e.g., natural language response data 165*f* corresponding to natural-sounding speech for "[event]").

In some embodiments, the feedback prompt generation component 130/the feedback detection and processing component 110 may be configured to interact with a storage, such as the feedback storage (not illustrated) to determine feedback prompt data. For example, the feedback storage may further include a plurality of feedback prompts generated by the feedback prompt generation component 130, which may be stored in association with their corresponding natural language inputs and optionally, associated dialog histories. The feedback prompt generation component 130/the feedback detection and processing component 110 may query the feedback storage using the natural language input data 105 and, optionally, the dialog history data 107 (or an encoded/hashed representation thereof) to determine whether a feedback prompt has already been generated for natural language input data corresponding to/semantically similar (e.g., based on the encoded representation of the natural language input data 105)/contextually similar (e.g., based on the natural language input data 105 and the dialog history data 107) to the natural language input data 105. In other words, the feedback prompt generation component 130/the feedback detection and processing component 110 may query the feedback storage for feedback prompt data stored in association with natural language input data that corresponds/is semantically similar/is contextually similar to the natural language input data 105. If such feedback prompt data is retrieved from the feedback storage, the feedback prompt data 135 may be sent to the language model 160 as the feedback prompt data 135, as discussed herein. If no feedback prompt data is retrieved, then the feedback prompt generation component 130 may process as described herein to generate the feedback prompt data 135.

As shown in FIG. 1, the feedback prompt data 135 is sent to the language model 160. For example, the feedback prompt data 135 may be used by the language model 160 to generate the natural language response data 165 responsive to the natural language input data 105. For example, as show in in FIG. 1, the language model 160 may receive the feedback prompt data 135 and generate the natural language response data 165. As also shown in FIG. 1, previous natural language input data 109 is sent to the training data storage 140, which may be determined using the dialog history data 107. The previous natural language input data 109 may correspond to the previous input for which the system-generated response, to which the user-provided feedback relates, was generated. For example, natural language input data 105 included user-provided feedback "that was too long" may refer to a previous system-generated response corresponding to a summary of "[subject]," which was generated in response to receiving the previous natural language input data 109 of "tell me about [subject]." As is discussed herein, the previous natural language input data 109 and the natural language response data 165 may be used to further train the language model 160 to generate future responses, that are similar (e.g., semantically/contextually similar) to the previous natural language input data 109, to incorporate the user-provided feedback included in the natural language input data 105 without the user having to again provide the user-provided feedback.

In some embodiments, the feedback prompt data 135 may be used by the language model 160 during runtime/inference (e.g., during a time of day when the system 100 is active and generating responses to received inputs). For example, if the feedback classifier 120 determines that a natural language input includes user-provided feedback, then an indication that the natural language input includes user-provided feedback may be provided to the prompt generation component 150. The indication may cause the processing of the prompt generation component 150 to cease/not begin. The feedback prompt generation component 130 may provide the language model 160 with the feedback prompt (e.g., the feedback prompt data 135) to use as the prompt directive, instead of a prompt (e.g., the prompt data 155) that would have been generated by the prompt generation component 150. As such, the language model 160 may use the feedback prompt data 135 to generate the natural language response data 163, instead of the prompt data 155, based on the feedback classifier 120 determining that the natural language input data 105 includes user-provided feedback. In some such embodiments, the natural language response data 163 may correspond to (e.g., be the same as) the natural language response data 165. In other embodiments, the feedback prompt data 135 may be provided to the language model 160 during offline processing (e.g., during a time of day when the system 100 is inactive and/or not currently generating responses to received inputs). In some such other embodiments, the language model 160 may use the prompt data 155 to generate the natural language response data 165 during runtime to be output to the user 405.

In some embodiments, as further shown in FIG. 1, the natural language response data 165 may also be sent to the training data storage 140, where the natural language response data 165 may be stored in association with the previous natural language input data 109. As discussed above, in some embodiments, the natural language response data 165 may be sent to the training data storage 140 during runtime, such as within a particular temporal proximity of generating the natural language response data 163. In other embodiments, the feedback prompt data 135 may be provided to the language model 160 during offline processing, where the language model 160 may process the feedback prompt data 135 to generate responsive natural language response data (e.g., the natural language response data 165), which may be sent to the training data storage 140 to be stored in association with the previous natural language input data 109. In some such embodiments, the natural language response data 165 (e.g., generated by the language model 160 during offline processing) to be sent to the training data storage may be different from the natural language response data 163 to be output to the user 405. In some embodiments, the natural language response data 165 may be sent to the feedback detection and processing component 110, which may generate data corresponding to the previous natural language input data 109 appended with the natural language response data 165 and send the data to the training data storage 140.

As is discussed in detail in connection with FIG. 2, in some embodiments, the natural language response data 165 and the previous natural language input data 109 may be sent to the training data storage 140 in response to the feedback detection and processing component 110/feedback prompt generation component 130 determining that the user-provided feedback associated with the natural language response data 165 satisfies a criteria (e.g., the user-provided feedback associated with the natural language response data 165 being associated with a particular confidence/score and/or the user-provided feedback associated with the natural language response data 165 being of a particular type of user-provided feedback, the storage including a particular number of (semantically) similar feedback-revised responses and associated user inputs). In some embodiments, in response to determining that the user-provided feedback associated with the natural language response data 165 does not satisfy the criteria, the natural language response data 165 and the previous natural language input data 109 may be stored in the training data storage 140 in associated with a user ID associated with the previous natural language input data 109.

The training data storage 140 may include a plurality of training data usable for a training one or more language models of the system, such as the language model 160 and/or one or more of the language models discussed herein in connection with FIG. 4. For example, the training data included in the training data storage 140 may be usable for performing supervised fine-tuning of the one or more language models of the system. In some embodiments, the training data included in the training data storage 140 may include an example input (e.g., a user-provided input, a non-user-provided input, as described herein in connection with FIG. 4, and/or associated context data (e.g., dialog history data 107)) and an example response to the example input (e.g., natural language response data 165, feedback-revised audio output data, feedback-revised image/video output data, etc.), where the example response is associated with user-provided feedback. In some such embodiments, the example input may correspond to a natural language input for which the system 100 generated a response that resulted in receiving user-provided feedback and the example response may correspond to natural language text/tokens, audio, and/or image/video data (e.g., the natural language response data 165, feedback-revised audio output data, feedback-revised image/video output data, etc.) generated by the language model 160 according to the user-provided feedback.

As discussed herein, in some embodiments, user-provided feedback may indicate a preference of a particular user for future responses generated by (one or more language models of) the system 100, such as a preferred verbosity, naturalness, accuracy, comprehensiveness, etc., of the responses generated by (one or more language models of) the system 100. Therefore, in some embodiments, the training data included in the training data storage 140 (e.g., the feedback prompt data 135) may be used to perform training (e.g., supervised fine-tuning) of a language model (e.g., the language model that generated the previously-generated response to which the user-feedback is directed, such as the language model 160) to generate future responses in compliance with the indicated preferences of the particular user. Further details regarding the training of a language model using system-generated prompts associated with user-provided feedback are discussed herein in connection with FIG. 2.

FIG. 2 illustrates example components and processing of the feedback prompt generation component 130. As shown in FIG. 2, the feedback detection and processing component 110 may include a prompt generation component 210 and a feedback prompt generation language model 220, and the system 100 may further include a language model training component 230.

As illustrated in FIG. 2, the natural language input data 105 and, optionally, the dialog history data 107 may be sent to the prompt generation component 210 of the feedback prompt generation component 130. In some embodiments, the prompt generation component 210 may be configured to process similar to the prompt generation component 150. For example, the prompt generation component 210 may process the natural language input data 105 and, optionally, the dialog history data 107 to generate prompt data 215 representing a prompt for input to the feedback prompt generation language model 220.

In some embodiments, the prompt data 215 may be a directive for the feedback prompt generation language model 220 to generate further prompt data (e.g., the feedback prompt data 135) directing a language model (e.g., the language model 160 and/or one or more of the language models discussed herein in connection with FIG. 4) to generate an output responsive to the user-provided feedback and a previously-received user input associated with the user-provided feedback. For example, for a natural language user input including user-provided feedback of "that was too long" and a dialog history including a previous user input of "tell me about [subject]" and a system-generated response to the previous user input corresponding to a summary of "[subject]," the prompt data 215 may correspond to "For a given user utterance, understand what the user wants, and convert it into a prompt which can be used later to help a language model generate desired responses." In some embodiments, the prompt generation component 150 may also include in the prompt data 155 a directive to output a response that satisfies certain conditions. Such conditions may relate to generating a response that is unbiased (toward protected classes, such as gender, race, age, etc.), non-harmful, profanity-free, etc. For example, the prompt data 155 may include "Please generate a polite, respectful, and safe response and one that does not violate protected class policy."

In some embodiments, the prompt data 215 may include one or more example inputs and corresponding example prompts generated based on the example inputs (e.g., exemplars for few-shot learning by the feedback prompt generation language model 220). For example, the prompt data 215*a* may further include "E.g., User utterance: it is too long; Output prompt: make the response shorter," or the like. In some such embodiments, the one or more example inputs and corresponding example prompts may be retrieved from a storage (not illustrated) based on determining that the example inputs are similar (e.g., semantically/contextually similar) to the natural language input data 105 and, optionally, the dialog history data 107.

As shown in FIG. 2, the prompt data 215 is sent to the feedback prompt generation language model 220. The feedback prompt generation language model 220 may be a language model (e.g., a generative model, such as one or more of the Amazon family of generative models, a generative pretrained transformer (GPT) model, a Bidirectional Encoded Representations for Transformers (BERT) model, or any other transformer-based model). In some embodiments, the feedback prompt generation language model 220 may correspond to the language model 160, in which case the feedback prompt generation language model 220 would not be included in the feedback prompt generation component 130. More specifically, the feedback prompt generation language model 220 may be configured to process the prompt data 215 to generate the feedback prompt data 135.

In some embodiments, the feedback prompt generation language model 220 may be configured as discussed herein as a result of supervised fine-tuning. For example, a (pre-trained) language model may be fine-tuned using a corpus of annotated training data including natural language inputs including user-provided feedback and associated annotations corresponding to a prompt corresponding to the user-provided feedback. During the supervised fine-tuning, the language model may be provided with an instance of user-provided feedback and be tasked with transforming the user-provided input into a prompt directing another language model to generate a response associated with the user-provided feedback. The prompt generated by the language model may be compared to the annotation and, based thereon, one or more parameters (e.g., weights) of the language model may be adjusted. In some embodiments, the corpus of annotated training data may further include dialog history data associated with the user-provided feedback, and the language model may be tasked with generating a prompt directing another language model to generate a response to a previous user input, to which the user-provided feedback relates, based on the user-provided feedback.

In some embodiments, the feedback prompt generation language model 220 may process the natural language input data 105 to generate a feedback prompt, and the previous natural language user input data to which the user-provided feedback is associated may be combined with the feedback prompt to generate the feedback prompt data 135. For example, for the natural language input data including user-provided feedback of "that is too long," which is associated with the previous natural language input data of "tell me about [subject]," the corresponding feedback prompt generated by the feedback prompt generation language model 220 of "Make the response shorter" may be combined with the previous natural language input data to generate the feedback prompt data of "tell me about [subject]. Make the response shorter," or the like.

As discussed above, the feedback prompt data 135 may be sent to the language model 160 and previous natural language input data 109, corresponding to the original natural language input to which the user-provided feedback relates, is sent to the training data storage 140. The language model 160 may process the feedback prompt data 135 to generate the natural language response data 165 and the natural language response data 165 may be sent to the training data storage 140, e.g., to be stored in association with the previous natural language input data 109.

In some embodiments, as discussed above, the natural language response data 165 and the previous natural language input data 109 may be sent to the training data storage 140 in response to the feedback detection and processing component 110/feedback prompt generation component 130 determining that the user-provided feedback associated with the natural language response data 165 satisfies a criteria indicating that the user-provided feedback may be useful for training a language model with respect to the user' preferences of multiple users (e.g., whether the user-provided feedback is relevant to multiple users, such as a global set of users). For example, the feedback detection and processing component 110/feedback prompt generation component 130 may determine that user-provided feedback satisfies a criteria based on determining a confidence/score associated with the user-provided feedback (e.g., as determined by the feedback classifier 120) meets/exceeds a threshold confidence/score. If the confidence/score associated with the user-provided feedback meets/exceeds the threshold confidence/score, then the user-provided feedback may satisfy the criteria and may be sent to the storage.

Additionally, or alternatively, for further example, the feedback detection and processing component 110/feedback prompt generation component 130 may determine that user-provided feedback satisfies the criteria based on a type of the user-provided feedback. Some types of user-provided feedback (e.g., accuracy, comprehensiveness, etc.) may be more likely to be relevant to multiple users than other types of user-provided feedback (e.g., verbosity, naturalness, etc.) and, therefore, may be useful for training a language model with respect to the user preferences of multiple users.

Additionally, or alternatively, as another example, the feedback detection and processing component 110/feedback prompt generation component 130 may determine that user-provided feedback satisfies the criteria based on a frequency with which similar user-provided feedback has been received by the system. For example, the feedback detection and processing component 110/feedback prompt generation component 130 may use the feedback storage (not illustrated) discussed above to track the frequency with which user-provided feedback is received. For example, the feedback storage may further include a counter representing the number of times an entry has been used by the feedback classifier 120 and/or the feedback prompt generation component 130 to perform its configured-for processing (e.g., based on the system 100 receiving a user input semantically/contextually similar to a previous user input determined to include user-provided feedback). Once the counter reaches a particular value, the feedback-revised response and the original user input associated with that entry may be determined to satisfy the criteria.

In some embodiments, as discussed above, if the feedback detection and processing component 110/feedback prompt generation component 130 determine that the user-provided feedback associated with the natural language response data 165 does not satisfy the criteria, this may indicate that the user-provided feedback may useful for training a language model with respect to the user preferences of the particular user associated with the user input determined to include the user-provided feedback (e.g., the user-provided feedback may be relevant to just the particular user), rather than with respect to the user preferences of multiple users. In response, the natural language response data 165 and the previous natural language input data 109 may be stored in the training data storage 140 in association with the particular user's user ID.

Periodically, training data included in the training data storage 140, such as the previous natural language input data 109 and the natural language response data 165, may be retrieved and used to train/retrain a language model(s) of the system 100. For example, as shown in FIG. 2, training data set 225 is retrieved from the training data storage 140 and is sent to the language model training component 230. The training data set 225 may include a plurality of training data tuples, including example user inputs and corresponding responses, which may include the previous natural language input data 109 and the natural language response data 165. The training data set 225 may be used by the language model training component 230 to perform supervised fine-tuning of one or more language models of the system 100, such as the language model 160.

In some embodiments, training a language model of the system 100 using the training data set 225 may result in the language model being configured to generate a response to a user input that incorporates user-provided feedback seen during the training without the user having to provide the feedback. For example, if the training data set 225 used to train the language model included training data associated with user-provided feedback requesting that a response to an input be made shorter (e.g., a user input including user-provided feedback of "that was too long") and training data associated with user-provided feedback requesting that a response to another input be worded more naturally (e.g., a user input including user-provided feedback of "that didn't sound natural"), then, after performing the training, the language model may be configured to generate responses (to inputs similar to those seen during training) that are shorter and/or more natural-sounding, without the user having to provide feedback requesting that the response be generated to be shorter and more natural-sounding.

In some embodiments, a language model of the system 100 may be trained using a training data set 225 retrieved from the training data storage 140 that is associated with a particular user 405. For example, the training data storage 140 may further store the training data (e.g., the previous natural language input data 109 and the natural language response data 165) in association with a user ID associated with a particular user 405. As such, in some such embodiments, the training data set 225 may represent one or more user preferences and may be used to perform supervised fine-tuning of the language model with respect to user-provided feedback associated with the particular user 405. Therefore, after training of the language model is complete, the language model may be configured to generate a response to a user input received from the particular user that incorporates user-provided feedback associated with that user 405 seen during training without the user 405 having to provide the feedback.

In other embodiments, the training data set 225 may be used as exemplars for few-shot learning by the language model during processing of a future user input. For example, in response to retrieving a user input semantically/contextually similar to a user input included in the training data set 225, the system 100 (e.g., the prompt generation component 150) may query the training data storage 140 for the training data set 225 (or one or more items of training data included in the training data set 225 that are semantically/contextually similar to the current user input) to be included in the prompt data provided to the language model to generate the response to the current user input. The training data set 225 (or the one or more items of training data) may represent examples usable by the language model to determine how to generate a response to the user input that incorporates the user-provided feedback associated with the examples.

FIG. 3 illustrates an example process that may be performed by the system 100 to detect and process user-provided feedback included in a user input. As shown in FIG. 3, the system 100 may receive (step 302) a user input and may receive (step 304) a dialog history including a previous user input and a previous response to the previous user input. For example, as discussed above, the natural language input data 105 may be received subsequent to presentation of a system-generated response (e.g., the natural language response data 165, audio output data, image/video output data, etc.) to the previous natural language input data 109.

Based on the user input and the dialog history, the system 100 may determine (step 306) the user input includes user-provided feedback associated with the previous user input and the previous response. For example, as discussed herein, the feedback classifier 120 may process the natural language input data 105 and the dialog history data 107 to determine whether the user input includes user-provided feedback.

Based on determining the user input includes the user-provided feedback, the system 100 may process (step 308), using a first language model, the user input and the dialog history to generate a prompt, the prompt directing a second language model to generate a response to the previous user input based on the user-provided feedback. For example, as discussed above, the natural language input data 105 and the dialog history data 107 may be processed by the prompt generation component 210 to generate the prompt data 215 directing the feedback prompt generation language model 220 to generate the feedback prompt data 135 to be provided to the language model 160.

The system may process (step 310), using the second language model, the prompt to generate a first response to the previous user input, the first response being associated with the user-provided feedback. For example, as discussed above, a feedback prompt (e.g., the feedback prompt data 135) may be sent to the language model 160 for processing to generate a response to the user input (e.g., the natural language response data 165, responsive audio data, responsive image/video data, etc.).

The system may determine (step 312) the user-provided feedback satisfies a criteria. For example, as discussed above, the criteria may indicate that the user-provide feedback is useful for training a language model with respect to the user preferences of multiple users, rather than a particular user. The feedback detection and processing component 110/feedback prompt generation component 130 may determine that the user-provided feedback associated with the feedback-revised response (e.g., the natural language response data 165, feedback-revised audio output data, feedback-revised image/video output data, etc.) is associated with a confidence/score that meets/exceeds a threshold, the user-provided feedback is associated with a particular type (e.g., accuracy, comprehensiveness, etc.), and/or the user-provided feedback is semantically/contextually associated with user-provided feedback that has been received with a particular frequency.

Based on determining the user-provided feedback satisfies the criteria and using the previous user input and the first response, the system may perform (314) updating (e.g., further training, such as supervised fine-tuning) of a first version of the second language model to generate a second version of the second language model, the second version of the second language model configured to generate a second response associated with the user-provided feedback in response to receiving a future user input associated with the previous user input. For example, as discussed herein, the previous user input (e.g., the previous natural language input data 109) and the feedback-revised response (e.g., the natural language response data 165, feedback-revised audio output data, feedback-revised image/video output data, etc.) may be used to perform training (e.g., supervised fine-tuning) of the language model 160 such that future responses, generated by the language model 160 in response to user inputs similar to the previous natural language input data 109, will be generated according to the user-provided feedback without the user having to further provide the user-provided feedback.

FIG. 4 illustrates further example components included in the system 100 configured to determine an action responsive to a user input. As shown in FIG. 4, the system may include a user device 410, local to a user 405, in communication with a system component(s) 420 via a network(s) 499. The network(s) 499 may include the Internet and/or any other wide- or local-area network, and may include wired, wireless, and/or cellular network hardware.

The system component(s) 420 may include various components, such as a language model orchestrator component 430, a personalized context component 465, and an action plan execution component 445. The language model orchestrator component 430 may include a task generation component 435, a language model shortlister component 440, and a response arbitration component 460.

In some embodiments, the language model orchestrator component 430 may generate prompt data representing a prompt for input to the language models. As shown in FIG. 4, the system component(s) 420 receive user input data 427, which may be provided to the language model orchestrator component 430. In some instances, the user input data 427 may correspond to various data types, such as text (e.g., a text or tokenized representation of a user input), audio, image, video, etc. For example, the user input data may include input text (or tokenized) data when the user input is a typed natural language user input. For further example, prior to the language model orchestrator component 430 receiving the user input data 427, another component (e.g., an automatic speech recognition (ASR) component 550) of the system 100 may receive audio data representing the user input. The ASR component 550 may perform ASR processing on the audio data to determine ASR data corresponding to the user input, which may correspond to a transcript of the user input. As described below, with respect to FIG. 5, the ASR component 550 may determine ASR data that includes an ASR N-best list including multiple ASR hypotheses and corresponding confidence scores representing what the user may have said. The ASR hypotheses may include text data, token data, ASR confidence score, etc. as representing the input utterance. The confidence score of each ASR hypothesis may indicate the ASR component's 550 level of confidence that the corresponding hypothesis represents what the user said. The ASR component 550 may also determine token scores corresponding to each token/word of the ASR hypothesis, where the token score indicates the ASR component's 550 level of confidence that the respective token/word was spoken by the user. The token scores may be identified as an entity score when the corresponding token relates to an entity. In some instances, the user input data 427 may include a top scoring ASR hypothesis of the ASR data. As an even further example, in some embodiments, the user input may correspond to an actuation of a physical button, data representing selection of a button displayed on a graphical user interface (GUI), image data of a gesture user input, combination of different types of user inputs (e.g., gesture and button actuation), etc. In such embodiments, the system 100 may include one or more components configured to process such user inputs to generate the text or tokenized representation of the user input (e.g., the user input data 427).

In some embodiments, the language model orchestrator component 430 may receive input data, which may be processed in a similar manner as the user input data 427 as described herein. The input data may be received in response to detection of an event such as change in device state (e.g., front door opening, garage door opening, TV turned off, etc.), occurrence of an acoustic event (e.g., baby crying, appliance beeping, etc.), presence of a user (e.g., a user approaching the user device 410, a user entering the home, etc.). In some embodiments, the system 100 may process the input data and generate a response/output. For example, the input data may be received in response to detection of a user generally or a particular user, an expiration of a timer, a time of day, detection of a change in the weather, a device state change, etc. In some embodiments, the input data may include data corresponding to the event, such as sensor data (e.g., image data, audio data, proximity sensor data, short-range wireless signal data, etc.), a description associated with the timer, the time of day, a description of the change in weather, an indication of the device state that changed, etc. The system 100 may include one or more components configured to process the input data to generate a natural language representation of the input data. The system 100 may process the input data and may perform an action. For example, in response to detecting a garage door opening, the system 100 may cause garage lights to turn on, living room lights to turn on, etc. As another example, in response to detecting an oven beeping, the system 100 may cause a user device 410 (e.g., a smartphone, a smart speaker, etc.) to present an alert to the user. The language model orchestrator component 430 may process the input data to generate tasks that may cause the foregoing example actions to be performed.

The user input data 427 may be received at the task generation component 435 of the language model orchestrator component 430, which may be configured to generate a list of (e.g., one or more) tasks (e.g., steps/actions) that are to be completed in order to perform an action responsive to the user input and select a task of the list of the tasks that is to be completed first (e.g., in a current iteration of processing by the system 100), as described in detail herein. For example, for a user input of "What is the weather for today," the task generation component 435 may generate a list of tasks of "(1) determine current outside temperature from thermostat; and (2) determine weather forecast for today" and select the task of "determine weather forecast for today" to be completed first. In instances where the task generation component 435 generates more than one task to be completed in order to perform the action responsive to the user input, the task generation component 435 may further maintain and prioritize the list of tasks as the processing of the system 100 with respect to the user input is performed. In other words, as the system 100 processes to complete the list of tasks, the task generation component 435 may (1) incorporate the potential responses associated with completed tasks into data provided to other components of the system 100; (2) update the list of tasks to indicate completed (or attempted, in-progress, etc.) tasks; (3) generate an updated prioritization of the tasks remaining to be completed (or tasks to be attempted again); and/or (4) determine an updated current task to be completed.

In some embodiments, the language model orchestrator component 430 (or one or more of the components discussed herein included in the language model orchestrator component 430) may be configured to communicate/interact with the feedback detection and processing component 110, similar to the processing discussed above with respect to FIGS. 1-3, where the feedback detection and processing component 110 (e.g., the feedback classifier 120) may be configured to determine whether an input (e.g., the user input data 427) includes user-provided feedback associated with previously-generated responsive output data responsive to previous user input data 468, e.g., based on the user input data 427 and dialog history data 464. Based thereon, the feedback detection and processing component (e.g., the feedback prompt generation component 130) may generate feedback prompt data 466 corresponding to a directive for (one or more language models of) the language model orchestrator component 430 to generate feedback-revised responsive output data to the previous user input data 468 based on the user-provided feedback.

Responsive output data 462, corresponding to the feedback-revised responsive output data, may be sent to the training data storage 140 to be stored in association with the previous user input data 468. Thereafter, a training data set 470 may be retrieved from the training data storage 140 to perform training of the (one or more language models of the) language model orchestrator component 430, as is discussed below.

In some embodiments, the task generation component 435 may process as described above using language model(s) (e.g., LLMs). For example, the task generation component 435 may include a language model (e.g., and LLM) configured to generate the list of tasks that are to be completed in order to perform the action responsive to the user input and select a task of the list of tasks that is to be completed first. In some such embodiments, the user input data 427 may be received at a prompt generation component configured to generate a prompt for input to the language model. The prompt may include the user input data 427 and various other information usable by the language model to generate the list of tasks that are to be completed in order to perform the action responsive to the user input (e.g., an indication of a remaining task(s) to be completed with respect to the user input, an indication of a potential response(s) associated with a completed task(s), and/or various contextual signals associated with the user input. The prompt may be a directive for the language model to determine the list of tasks given the information included in the prompt. The language model may process the prompt to generate the list of tasks.

The task generation component 435 may generate and send task data 437 representing the selected task to be completed and various other information needed to perform further processing with respect to the task (e.g., the user input data 427, an indication of the selected task, potential responses associated with previous tasks, the remaining task(s), and context data associated with the user input data 427, as described in detail herein) to the language model shortlister component 440.

Application programming interfaces (APIs) are a way for one program/component to interact with another. API calls are the medium by which they interact. An API call, or API request, is a message sent to a system component asking an API to perform an action, provide a service or information, or the like. An API call may be formatted for the particular API and may include a particular request, optionally using particular arguments and argument values. API calls may be used for a variety of purposes, such as controlling other devices (e.g., an API call of turn_on_device (device="indoor light 1") corresponds to a directive/request to a component to turn on a device associated with the identifier "indoor light 1"), obtaining information from other components (e.g., an API call of InfoQA question ("Who is the president of USA?") corresponds to a directive/request to a component to find and provide an answer to the indicated question), and performing other actions (e.g., generating synthesized speech, searching data sources, etc.).

In some embodiments, the system may include an API retrieval component configured to receive a search query and output one or more API calls (or API data) matching the search query. API data may include an API call, API description, component description, and other information associated with the API call. In some embodiments, a language model of the system may generate an action to be performed with respect to the user input, where the action may be represented as an action description, an API, an API description, etc. Based on the generated action, the system may use the API retrieval component to determine one or more APIs available to perform the generated action. For example, in response to the user input "book a flight", the language model may generate the action "I need to find an API to book flight" or "I need to book a flight using Book.flight ([Departure], [Arrival])." Based on the generated action, the system may search the API retrieval component to determine one or more API calls corresponding to booking a flight (e.g., Bookflight.location ("departing airport code", "arrival airport code"), Bookflight.date ("departing date"), bookflight.roundtrip ("departing location", "arrival location", "departure date", "return date"), AirlineBookFlight ("departing airport code", "arrival airport code"), etc.). Based on the user input and other information (e.g., context data corresponding to the user input, user preferences, past user interactions, further information received from user, etc.), the system may select one or more of the determined API calls to execute.

The language model shortlister component 440 may be configured to determine one or more components (e.g., a responding component, such as APIs, skill component(s), language model (e.g., LLM) agent component(s), a TTS component, etc. as discussed herein) configured to perform an action related to the user input or the current task. The language model shortlister component 440 may further be configured to generate and cause the execution of a request(s) (e.g., an API call(s), an incomplete API call/API call format, an indication of an action to be performed by a component, etc.) for the one or more components to provide a potential responses(s) to the user input or current task (e.g., a response to a user-provided question, a paragraph from a website, etc.), which may further include a potential action (e.g., a description of a potential action, such as turning on a light, booking a flight ticket, ordering a pizza, etc.) the components are configured to/will perform with respect to the user input or the current task). For example, for a current task of "determine weather forecast for today," the language model shortlister component 440 may generate requests of "use Weather Application A to determine weather forecast for today" and "use Weather Application B to determine weather forecast for today," or the like.

In some embodiments, the language model shortlister component 440 may process as described above using a language model(s) (e.g., LLMs). For example, the language model shortlister component 440 may include a language model (e.g., an LLM) configured to determine one or more components configured to perform an action related to the user input or the current task and cause the execution of a request(s) for the component(s) to provide a potential response(s) to the user input or current task. In some such embodiments, the task data 437 may be received at a prompt generation component configured to generate a prompt for input to the language model. The prompt may include the task data 437 and an indication of component(s) (e.g., APIs) determined to be relevant to the current task/the user input. The prompt may be a directive for the language model to generate a request for a component(s) (of the components determined to be relevant) to provide a potential response(s) to the user input or current task given the information included in the prompt. The language model may process the prompt to generate the request(s).

Such requests may be represented in the action plan data 442 sent to the action plan execution component 445. The action plan execution component 445 may identify the request(s) in the action plan data 442, generate executable API calls corresponding to the request(s), and cause the corresponding components (e.g., the responding component(s)) to generate action response data 458*a-n* representing the requested potential response(s), where individual action response data 458*a* may be provided by/correspond to a particular responding component. In some embodiments, the action response data 458*a-n* may include an identifier (e.g., a component name, an alphanumerical value associated with the component, etc.) for the component providing the data. The language model shortlister component 440 receives and processes the action response data 458*a-n* and generates potential response data 443*a-n* representing the potential response(s) (e.g., relevant potential responses, selected potential responses, ranked potential responses, etc.) for further processing (e.g., as described in detail herein). If the language model shortlister component 440 determines that there are no remaining tasks to generate potential responses for, the language model shortlister component 440 may send the potential response data 443*a-n* to the response arbitration component 460.

The potential response data 443*a-n*, in some embodiments, may be determined based on receiving potential responses from various different components that may be relevant in responding to the user input data 427. For example, the potential response data 443*a-n* may include a first potential response from a first component configured to perform a first task determined by the task generation component 435, a second potential response from a second component configured to perform a second task determined by the task generation component 435, etc. The potential response data 443*a-n* can include more than one potential response relating to an individual task. In some embodiments, the potential response data 443*a-n* may be natural language data.

The response arbitration component 460 processes the potential response data 443*a-n* to determine whether the potential responses generated for the task(s) are responsive to the user input. The response arbitration component 460 processes the potential response data 443*a-n* (representing at least the generated potential responses) and selects one or more of the potential responses that are determined to be responsive to the user input and/or determines that none of the actions are responsive to the user input. For example, the response arbitration component 460 may process the potential response data 443*a-n* to determine if one or more of the potential responses performable by the API(s) (e.g., the potential responses and/or potential actions) are responsive to the current task. In some embodiments, the response arbitration component 460 may generate a natural language summary of one or more of the selected responses and output the natural language summary. For example, for a user input of "what is the weather for today" and potential responses of "The weather for today is a high of 75 and a low of 68" and "The weather for today is mostly sunny with a slight chance of rain in the evening," the response arbitration component 460 may generate a natural language summary of "The weather for today is expected to be mostly sunny with a high of 75 and a low of 68 and a slight chance of rain in the evening," or the like.

In some embodiments, the response arbitration component 460 may process as described above using language model(s) (e.g., LLMs), such as the language model 160. For example, the response arbitration component 460 may include a language model (e.g., an LLM) configured to generate a response to the user input using one or more of the potential responses that are determined to be responsive to the user input and/or determines that none of the potential responses are responsive to the user input. In some such embodiments, the user input data 427 and the potential responses (and in some embodiments, the contextual signals associated with the user input) may be received at a prompt generation component configured to generate a prompt for input to the language model including the information. The prompt may be a directive for the language model to, given the information included in the prompt, generate a response to the user input using one or more of the potential responses that are determined to be responsive to the user input and/or indicate that none of the potential responses are responsive to the user input. The language model may process the prompt to generate the response to the user input or the indication that none of the potential response are responsive to the user input. In instances where the language model generate the indication that none of the potential responses are responsive to the user input, the indication may further include a request for information to be output to the user (and/or provided to another component of the system configured to determine the information).

The output generated by the response arbitration component 460 may be provided to one or more components of the system 100 (e.g., the TTS component 556, a visual output component, etc. via, for example, the action plan execution component 445) and/or sent to the device 410 for output to the user.

In some embodiments, the response arbitration component 460 may be configured to communicate/interact with the feedback detection and processing component 110. For example, as discussed above, the feedback detection and processing component 110 (e.g., the feedback classifier 120) may determine whether an input (e.g., the user input data 427) includes user-provided feedback associated with previously-generated responsive output data responsive to previous user input data 468, e.g., based on the user input data 427 and dialog history data 464. Based thereon, the feedback detection and processing component (e.g., the feedback prompt generation component 130) may generate feedback prompt data 466 corresponding to a directive for the response arbitration component 460 to generate, based on the user-provided feedback, the responsive output data 462 to be responsive to the previous user input data 468. Thereafter, the training data set 470, including at least the previous user input data 468 and the responsive output data 462, may be used to perform training (e.g., supervised finetuning) of the response arbitration component 460, such that the response arbitration component 460 may generate future responsive output data associated with the user-provided feedback in response to receiving future user input data similar to the user input data 427 without having received additional, similar user-provided feedback.

The system 100 may operate using various components as described in FIG. 5. The various components may be located on same or different physical devices. Communication between various components may occur directly or across a network(s) 499. The user device 410 may include audio capture component(s), such as a microphone or array of microphones of a user device 410, captures audio 510 and creates corresponding audio data. Once speech is detected in audio data representing the audio 510, the user device 410 may determine if the speech is directed at the user device 410/system component(s). In at least some embodiments, such determination may be made using a wakeword detection component 520. The wakeword detection component 520 may be configured to detect various wakewords. In at least some examples, each wakeword may correspond to a name of a different digital assistant. An example wakeword/digital assistant name is "Alexa." In another example, input to the system may be in form of text data 513, for example as a result of a user typing an input into a user interface of user device 410. Other input forms may include indication that the user has pressed a physical or virtual button on user device 410, the user has made a gesture, etc. The user device 410 may also capture images using camera(s) of the user device 410 and may send image data 521 representing those image(s) to the system component(s). The image data 521 may include raw image data or image data processed by the user device 410 before sending to the system component(s). The image data 521 may be used in various manners by different components of the system to perform operations such as determining whether a user is directing an utterance to the system, interpreting a user command, responding to a user command, etc.

The wakeword detection component 520 of the user device 410 may process the audio data, representing the audio 510, to determine whether speech is represented therein. The user device 410 may use various techniques to determine whether the audio data includes speech. In some examples, the user device 410 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 410 may implement a classifier configured to distinguish speech from background noise. The classifier may be implemented by techniques such as linear classifiers, support vector machines, and decision trees. In still other examples, the user device 410 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 510, is analyzed to determine if specific characteristics of the audio data match preconfigured acoustic waveforms, audio signatures, or other data corresponding to a wakeword.

Thus, the wakeword detection component 520 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 520 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 520 and/or input is detected by an input detector, the user device 410 may "wake" and begin transmitting audio data 511, representing the audio 510, to the system component(s) 420. The audio data 511 may include data corresponding to the wakeword; in other embodiments, the portion of the audio corresponding to the wakeword is removed by the user device 410 prior to sending the audio data 511 to the system component(s) 420. In the case of touch input detection or gesture based input detection, the audio data may not include a wakeword.

In some implementations, the system 100 may include more than one system component(s). The system component(s) 420 may respond to different wakewords and/or perform different categories of tasks. Each system component(s) may be associated with its own wakeword such that speaking a certain wakeword results in audio data be sent to and processed by a particular system. For example, detection of the wakeword "Alexa" by the wakeword detection component 520 may result in sending audio data to system component(s) 120*a* for processing while detection of the wakeword "Computer" by the wakeword detector may result in sending audio data to system component(s) 120*b* for processing. The system may have a separate wakeword and system for different skills/systems (e.g., "Dungeon Master" for a game play skill/system component(s) 120*c*) and/or such skills/systems may be coordinated by one or more skill component(s) 554 of one or more system component(s) 420.

The user device 410/system component(s) may also include a system directed input detector 585. The system directed input detector 585 may be configured to determine whether an input to the system (for example speech, a gesture, etc.) is directed to the system or not directed to the system (for example directed to another user, etc.). The system directed input detector 585 may work in conjunction with the wakeword detection component 520. If the system directed input detector 585 determines an input is directed to the system, the user device 410 may "wake" and begin sending captured data for further processing. If data is being processed the user device 410 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 585 determines an input is not directed to the system (such as a speech or gesture directed to another user) the user device 410 may discard the data and take no further action for processing purposes. In this way the system 100 may prevent processing of data not directed to the system, thus protecting user privacy. As an indicator to the user, however, the system may output an audio, visual, or other indicator when the system directed input detector 585 is determining whether an input is potentially device directed. For example, the system may output an orange indicator while considering an input, and may output a green indicator if a system directed input is detected. Other such configurations are possible.

Upon receipt by the system component(s) 420, the audio data 511 may be sent to an orchestrator component 530 and/or the language model orchestrator component 430. The orchestrator component 530 may include memory and logic that enables the orchestrator component 530 to transmit various pieces and forms of data to various components of the system, as well as perform other operations as described herein. In some embodiments, the orchestrator component 530 may optionally be included in the system component(s) 420. In embodiments where the orchestrator component 530 is not included in the system component(s) 420, the audio data 511 may be sent directly to the language model orchestrator component 430. Further, in such embodiments, each of the components of the system component(s) 420 may be configured to interact with the language model orchestrator component 430, the action plan execution component 445, and/or the API provider component.

In some embodiments, the system component(s) 420 may include an arbitrator component 582, which may be configured to determine whether the orchestrator component 530 and/or the language model orchestrator component 430 are to process with respect to the audio data 511. In some embodiments, the language model orchestrator component 430 may be selected to process with respect to the audio data 511 only if the user 405 associated with the audio data 511 (or the user device 410 that captured the audio 510) has previously indicated that the language model orchestrator component 430 may be selected to process with respect to user inputs received from the user 405.

In some embodiments, the arbitrator component 582 may determine the orchestrator component 530 and/or the language model orchestrator component 430 are to process with respect to the audio data 511 based on metadata associated with the audio data 511. For example, the arbitrator component 582 may be a classifier configured to process a natural language representation of the audio data 511 (e.g., output by the ASR component 550) and classify the corresponding user input as to be processed by the orchestrator component 530 and/or the language model orchestrator component 430. For further example, the arbitrator component 582 may determine whether the device from which the audio data 511 is received is associated with an indicator representing the audio data 511 is to be processed by the orchestrator component 530 and/or the language model orchestrator component 430. As an even further example, the arbitrator component 582 may determine whether the user (e.g., determined using data output from the user recognition component 595) from which the audio data 511 is received is associated with a user profile including an indicator representing the audio data 511 is to be processed by the orchestrator component 530 and/or the language model orchestrator component 430. As another example, the arbitrator component 582 may determine whether the audio data 511 (or the output of the ASR component 550) corresponds to a request representing that the audio data 511 is to be processed by the orchestrator component 530 and/or the language model orchestrator component 430 (e.g., a request including "let's chat" may represent that the audio data 511 is to be processed by the language model orchestrator component 430).

In some embodiments, if the arbitrator component 582 is unsure (e.g., a confidence score corresponding to whether the orchestrator component 530 and/or the language model orchestrator component 430 is to process is below a threshold), then the arbitrator component 582 may send the audio data 511 to both of the orchestrator component 530 and the language model orchestrator component 430. In such embodiments, the orchestrator component 530 and/or the language model orchestrator component 430 may include further logic for determining further confidence scores during processing representing whether the orchestrator component 530 and/or the language model orchestrator component 430 should continue processing, as is discussed further herein.

The arbitrator component 582 may send the audio data 511 to an ASR component 550. In some embodiments, the component selected to process the audio data 511 (e.g., the orchestrator component 530 and/or the language model orchestrator component 430) may send the audio data 511 to the ASR component 550. The ASR component 550 may transcribe the audio data 511 into text data. The text data output by the ASR component 550 represents one or more than one (e.g., in the form of an N-best list) ASR hypotheses representing speech represented in the audio data 511. The ASR component 550 interprets the speech in the audio data 511 based on a similarity between the audio data 511 and pre-established language models. For example, the ASR component 550 may compare the audio data 511 with models for sounds (e.g., acoustic units such as phonemes, senons, phones, etc.) and sequences of sounds to identify words that match the sequence of sounds of the speech represented in the audio data 511. The ASR component 550 sends the text data generated thereby to the arbitrator component 582, the orchestrator component 530, and/or the language model orchestrator component 430. In instances where the text data is sent to the arbitrator component 582, the arbitrator component 582 may send the text data to the component selected to process the audio data 511 (e.g., the orchestrator component 530 and/or the language model orchestrator component 430). The text data sent from the ASR component 550 to the arbitrator component 582, the orchestrator component 530, and/or the language model orchestrator component 430 may include a single top-scoring ASR hypothesis or may include an N-best list including multiple top-scoring ASR hypotheses. An N-best list may additionally include a respective score associated with each ASR hypothesis represented therein.

In some embodiments, the orchestrator component 530 may cause a NLU component (not shown) to perform processing with respect to the ASR data generated by the ASR component 550. The NLU component may attempt to make a semantic interpretation of the phrase(s) or statement(s) represented in the ASR data input therein by determining one or more meanings associated with the phrase(s) or statement(s) represented in the text data. The NLU component may determine an intent representing an action that a user desires be performed and may determine information that allows a device (e.g., the device 410, the system component(s) 420, a skill component 554, a skill system component(s) 425, etc.) to execute the intent. For example, if the ASR data corresponds to "play the 5th Symphony by Beethoven," the NLU component may determine an intent that the system output music and may identify "Beethoven" as an artist/composer and "5th Symphony" as the piece of music to be played. For further example, if the ASR data corresponds to "what is the weather," the NLU component may determine an intent that the system output weather information associated with a geographic location of the device 410. In another example, if the ASR data corresponds to "turn off the lights," the NLU component may determine an intent that the system turn off lights associated with the device 410 or the user 405. However, if the NLU component is unable to resolve the entity—for example, because the entity is referred to by anaphora such as "this song" or "my next appointment"—the system can send a decode request to another speech processing system for information regarding the entity mention and/or other context related to the utterance. The natural language processing system may augment, correct, or base results data upon the ASR data as well as any data received from the system.

The NLU component may return NLU results data (which may include tagged text data, indicators of intent, etc.) back to the orchestrator component 530. The orchestrator component 530 may forward the NLU results data to a skill component(s) 554. If the NLU results data includes a single NLU hypothesis, the NLU component and the orchestrator component 530 may direct the NLU results data to the skill component(s) 554 associated with the NLU hypothesis. If the NLU results data includes an N-best list of NLU hypotheses, the NLU component and the orchestrator component 530 may direct the top scoring NLU hypothesis to a skill component(s) 554 associated with the top scoring NLU hypothesis. The system may also include a post-NLU ranker which may incorporate other information to rank potential interpretations determined by the NLU component.

In some embodiments, after determining that the orchestrator component 530 and/or the language model orchestrator component 430 should process with respect to the user input data 427, the arbitrator component 582 may be configured to periodically determine whether the orchestrator component 530 and/or the language model orchestrator component 430 should continue processing with respect to the user input data 427. For example, after a particular point in the processing of the orchestrator component 530 (e.g., after performing NLU, prior to determining a skill component 554 to process with respect to the user input data 427, prior to performing an action responsive to the user input, etc.) and/or the language model orchestrator component 430 (e.g., after selecting a task to be completed, after receiving the action response data from the one or more components, after completing a task, prior to performing an action responsive to the user input, etc.) the orchestrator component 530 and/or the language model orchestrator component 430 may query the arbitrator component 582 has determined that the orchestrator component 530 and/or the language model orchestrator component 430 should halt processing with respect to the user input data 427. As discussed above, the system 100 may be configured to stream portions of data associated with processing with respect to a user input to the one or more components such that the one or more components may begin performing their configured processing with respect to that data as soon as it is available to the one or more components. As such, the arbitrator component 582 may cause the orchestrator component 530 and/or the language model orchestrator component 430 to begin processing with respect to a user input as soon as a portion of data associated with the user input data 427 is available (e.g., the ASR data, context data, output of the user recognition component 595. Thereafter, once the arbitrator component 582 has enough data to perform the processing described herein to determine whether the orchestrator component 530 and/or the language model orchestrator component 430 is to process with respect to the user input, the arbitrator component 582 may inform the corresponding component (e.g., the orchestrator component 530 and/or the language model orchestrator component 430) to continue/halt processing with respect to the user input at one of the logical checkpoints in the processing of the orchestrator component 530 and/or the language model orchestrator component 430.

As discussed herein, in some embodiments, the language model shortlister component 440 may be configured to select the orchestrator component 530 to process with respect to the user input and/or a current task to return action response data (e.g., the action response data 458*a*) representing a response to the user input/current task or a description of an action the orchestrator component 530 may cause to be performed in response to the user input/current task. As such, in some embodiments, although the language model orchestrator component 430 is determined to process with respect to a user input, the language model orchestrator component 430 may determine, during such processing, that the orchestrator component 530 should process with respect to the user input.

A skill system component(s) 425 may communicate with a skill component(s) 554 within the system component(s) 420 directly with the orchestrator component 530 and/or the action plan execution component 445, or with other components. A skill system component(s) 425 may be configured to perform one or more actions. An ability to perform such action(s) may sometimes be referred to as a "skill." That is, a skill may enable a skill system component(s) 425 to execute specific functionality in order to provide data or perform some other action requested by a user. For example, a weather service skill may enable a skill system component(s) 425 to provide weather information to the system component(s) 420, a car service skill may enable a skill system component(s) 425 to book a trip with respect to a taxi or ride sharing service, an order pizza skill may enable a skill system component(s) 425 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 420 may be configured with a skill component 554 dedicated to interacting with the skill system component(s) 425. Unless expressly stated otherwise, reference to a skill, skill device, or skill component may include a skill component 554 operated by the system component(s) 420 and/or skill operated by the skill system component(s) 425. Moreover, the functionality described herein as a skill or skill may be referred to using many different terms, such as an action, bot, app, or the like. The skill component 554 and or skill system component(s) 425 may return output data to the orchestrator component 530.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system component(s) includes a TTS component 556. The TTS component 556 may generate audio data (e.g., synthesized speech) from text data using one or more different methods. Text data input to the TTS component 556 may come from a skill component 554, the orchestrator component 530, or another component of the system. In one method of synthesis called unit selection, the TTS component 556 matches text data against a database of recorded speech. The TTS component 556 selects matching units of recorded speech and concatenates the units together to form audio data. In another method of synthesis called parametric synthesis, the TTS component 556 varies parameters such as frequency, volume, and noise to create audio data including an artificial speech waveform. Parametric synthesis uses a computerized voice generator, sometimes called a vocoder.

The user device 410 may include still image and/or video capture components such as a camera or cameras to capture one or more images. The user device 410 may include circuitry for digitizing the images and/or video for transmission to the system component(s) 420 as image data. The user device 410 may further include circuitry for voice command-based control of the camera, allowing a user 405 to request capture of image or video data. The user device 410 may process the commands locally or send audio data 511 representing the commands to the system component(s) 420 for processing, after which the system component(s) 420 may return output data that can cause the user device 410 to engage its camera.

The system component(s) 420/the user device 410 may include a user recognition component 595 that recognizes one or more users using a variety of data. However, the disclosure is not limited thereto, and the user device 410 may include the user recognition component 595 instead of and/or in addition to the system component(s) 420 without departing from the disclosure.

The user recognition component 595 may take as input the audio data 511 and/or text data output by the ASR component 550. The user recognition component 595 may perform user recognition by comparing audio characteristics in the audio data 511 to stored audio characteristics of users. The user recognition component 595 may also perform user recognition by comparing biometric data (e.g., fingerprint data, iris data, etc.), received by the system in correlation with the present user input, to stored biometric data of users assuming user permission and previous authorization. The user recognition component 595 may further perform user recognition by comparing image data (e.g., including a representation of at least a feature of a user), received by the system in correlation with the present user input, with stored image data including representations of features of different users. The user recognition component 595 may perform additional user recognition processes, including those known in the art.

The user recognition component 595 determines scores indicating whether user input originated from a particular user. For example, a first score may indicate a likelihood that the user input originated from a first user, a second score may indicate a likelihood that the user input originated from a second user, etc. The user recognition component 595 also determines an overall confidence regarding the accuracy of user recognition operations.

Output of the user recognition component 595 may include a single user identifier corresponding to the most likely user that originated the user input. Alternatively, output of the user recognition component 595 may include an N-best list of user identifiers with respective scores indicating likelihoods of respective users originating the user input. The output of the user recognition component 595 may be used to inform processing of the arbitrator component 582, the orchestrator component 530, and/or the language model orchestrator component 430 as well as processing performed by other components of the system.

The system component(s) 420/user device 410 may include a presence detection component that determines the presence and/or location of one or more users using a variety of data.

The system 100 (either on user device 410, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 570 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 410, the user profile (associated with the presented login information) may be updated to include information about the user device 410, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 570 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 570 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Although the components of FIG. 5 may be illustrated as part of system component(s) 420, user device 410, or otherwise, the components may be arranged in other device(s) (such as in user device 410 if illustrated in system component(s) 420 or vice-versa, or in other device(s) altogether) without departing from the disclosure.

In at least some embodiments, the system component(s) may receive the audio data 511 from the user device 410, to recognize speech corresponding to a spoken input in the received audio data 511, and to perform functions in response to the recognized speech. In at least some embodiments, these functions involve sending directives (e.g., commands), from the system component(s) to the user device 410 (and/or other user devices 410) to cause the user device 410 to perform an action, such as output an audible response to the spoken input via a loudspeaker(s), and/or control secondary devices in the environment by sending a control command to the secondary devices.

Thus, when the user device 410 is able to communicate with the system component(s) over the network(s) 499, some or all of the functions capable of being performed by the system component(s) may be performed by sending one or more directives over the network(s) 499 to the user device 410, which, in turn, may process the directive(s) and perform one or more corresponding actions. For example, the system component(s), using a remote directive that is included in response data (e.g., a remote response), may direct the user device 410 to output an audible response (e.g., using TTS processing performed by an on-device TTS component) to a user's question via a loudspeaker(s) of (or otherwise associated with) the user device 410, to output content (e.g., music) via the loudspeaker(s) of (or otherwise associated with) the user device 410, to display content on a display of (or otherwise associated with) the user device 410, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 405 as part of a shopping function, establishing a communication session (e.g., a video call) between the user 405 and another user, and so on.

In at least some embodiments, a hybrid selector, of the user device 410, may send the audio data 511 to the wakeword detection component 520. If the wakeword detection component 520 detects a wakeword in the audio data 511, the wakeword detection component 520 may send an indication of such detection to the hybrid selector. In response to receiving the indication, the hybrid selector may send the audio data 511 to the system component(s) and/or the ASR component of the user device 410. The wakeword detection component 520 may also send an indication, to the hybrid selector, representing a wakeword was not detected. In response to receiving such an indication, the hybrid selector may refrain from sending the audio data 511 to the system component(s), and may prevent the ASR component of the user device 410 from further processing the audio data 511. In this situation, the audio data 511 can be discarded.

In some embodiments, the user device 410 may include some or all of the components illustrated in FIG. 5 and/or discussed herein with respect to the system component(s) 420. In other embodiments, the components illustrated in FIG. 5 and/or discussed herein with respect to the system component(s) 420 may be distributed across the user device 410 and the system component(s) 420.

In at least some embodiments, the components of the user device 410 (e.g., on-device components) may not have the same capabilities as the components of the system component(s). For example, on-device components may be configured to handle only a subset of the natural language user inputs that may be handled by the system component(s) 420. For example, such subset of natural language user inputs may correspond to local-type natural language user inputs, such as those controlling devices or components associated with a user's home. In such circumstances the on-device components may be able to more quickly interpret and respond to a local-type natural language user input, for example, than processing that involves the system component(s). If the user device 410 attempts to process a natural language user input for which the on-device components are not necessarily best suited, the language processing results determined by the user device 410 may indicate a low confidence or other metric indicating that the processing by the user device 410 may not be as accurate as the processing done by the system component(s).

The hybrid selector, of the user device 410, may include a hybrid proxy (HP) configured to proxy traffic to/from the system component(s). For example, the HP may be configured to send messages to/from a hybrid execution controller (HEC) of the hybrid selector. For example, command/directive data received from the system component(s) can be sent to the HEC using the HP. The HP may also be configured to allow the audio data 511 to pass to the system component(s) while also receiving (e.g., intercepting) this audio data 511 and sending the audio data 511 to the HEC.

In at least some embodiments, the hybrid selector may further include a local request orchestrator (LRO) configured to notify the ASR component of the user device 410 about the availability of new audio data 511 that represents user speech, and to otherwise initiate the operations of local language processing when new audio data 511 becomes available. In general, the hybrid selector may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the user device 410 receives directive data from the system component(s) and chooses to use that remotely-determined directive data.

Thus, when the audio data 511 is received, the HP may allow the audio data 511 to pass through to the system component(s) and the HP may also input the audio data 511 to the on-device ASR component by routing the audio data 511 through the HEC of the hybrid selector, whereby the LRO notifies the on-device ASR component of the audio data 511. At this point, the hybrid selector may wait for response data from either or both of the system component(s) or the local language processing components. However, the disclosure is not limited thereto, and in some examples the hybrid selector may send the audio data 511 only to the local ASR component without departing from the disclosure. For example, the user device 410 may process the audio data 511 locally without sending the audio data 511 to the system component(s).

The local ASR component is configured to receive the audio data 511 from the hybrid selector, and to recognize speech in the audio data 511. The user device 410 and/or the system component(s) may associate a unique identifier with each natural language user input. The user device 410 may include the unique identifier when sending the audio data 511 to the system component(s), and the response data from the system component(s) may include the unique identifier to identify which natural language user input the response data corresponds.

In at least some embodiments, the user device 410 may include, or be configured to use, one or more skill components that may work similarly to the skill component(s) 554 implemented by the system component(s). The skill component(s) may correspond to one or more domains that are used in order to determine how to act on a spoken input in a particular way, such as by outputting a directive that corresponds to the determined intent, and which can be processed to implement the desired operation. The skill component(s) installed on the user device 410 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the user device 410 may be in communication with one or more skill system component(s) 425. For example, a skill system component(s) 425 may be located in a remote environment (e.g., separate location) such that the user device 410 may only communicate with the skill system component(s) 425 via the network(s) 499. However, the disclosure is not limited thereto. For example, in at least some embodiments, a skill system component(s) 425 may be configured in a local environment (e.g., home server and/or the like) such that the user device 410 may communicate with the skill system component(s) 425 via a private network, such as a local area network (LAN).

Various techniques may be used to train and operate models to perform various steps described herein, such as user recognition, sentiment detection, image processing, dialog management, natural language processing, etc. Models may be trained and operated according to various machine learning techniques. Such techniques may be used for trained models such as, neural networks, deep neural networks, recurrent neural networks, language models, LLMs, generative models, inference engines, trained classifiers, discriminative models, probabilistic models, etc. Examples of trained classifiers include Support Vector Machines (SVMs), neural networks, decision trees, AdaBoost (short for "Adaptive Boosting") combined with decision trees, and random forests.

Example supervised learning techniques may involve learning algorithms that analyze data and recognize patterns in the data, and which are commonly used for classification and regression analysis. Given a set of training examples, each marked as belonging to one of two categories, a training algorithm builds a trained model that assigns new examples into one category or the other, making it a non-probabilistic binary linear classifier. Other trained models may be built with the training set identifying more than two categories, with the trained model determining which category is most similar to input data. A trained model may be mapped so that the examples of the separate categories are divided/separated by distinctive gaps. New examples/inputs are then mapped into that same space and predicted to belong to a category based on which side of the gaps they fall on. Some trained models may issue a "score" indicating which category the input data most closely matches. The score may provide an indication of how closely the data matches the category.

Training a machine-based model component such as, generative models, discriminative models, etc., may require establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, unsupervised learning, finetuning learning, reinforcement learning, stochastic learning, or other known techniques.

FIG. 6 is a block diagram conceptually illustrating a user device 410 that may be used with the system. FIG. 7 is a block diagram conceptually illustrating example components of a remote device, such as the natural language command processing system component(s), which may assist with ASR processing, NLU processing, etc., and a skill system component(s) 425. System component(s) (420/425) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the user device 410 may operate locally to a user (e.g., within a same environment so the device may receive inputs and playback outputs for the user) the server/system component(s) may be located remotely from the user device 410 as its operations may not require proximity to the user. The server/system component(s) may be located in an entirely different location from the user device 410 (for example, as part of a cloud computing system or the like) or may be located in a same environment as the user device 410 but physically separated therefrom (for example a home server or similar device that resides in a user's home or business but perhaps in a closet, basement, attic, or the like). The system component(s) 420 may also be a version of a user device 410 that includes different (e.g., more) processing capabilities than other user device(s) 410 in a home/office. One benefit to the server/system component(s) being in a user's home/business is that data used to process a command/return a response may be kept within the user's home, thus reducing potential privacy concerns.

Multiple system components (420/425) may be included in the overall system 100 of the present disclosure, such as one or more natural language processing system component(s) 420 for performing ASR processing, one or more natural language processing system component(s) 420 for performing NLU processing, one or more skill system component(s) 425, etc. In operation, each of these systems may include computer-readable and computer-executable instructions that reside on the respective device (420/425), as will be discussed further below.

Each of these devices (410/420/425) may include one or more controllers/processors (604/704), which may each include a central processing unit (CPU) for processing data and computer-readable instructions, and a memory (606/706) for storing data and instructions of the respective device. The memories (606/706) may individually include volatile random-access memory (RAM), non-volatile read only memory (ROM), non-volatile magnetoresistive memory (MRAM), and/or other types of memory. Each device (410/420/425) may also include a data storage component (608/708) for storing data and controller/processor-executable instructions. Each data storage component (608/708) may individually include one or more non-volatile storage types such as magnetic storage, optical storage, solid-state storage, etc. Each device (410/420/425) may also be connected to removable or external non-volatile memory and/or storage (such as a removable memory card, memory key drive, networked storage, etc.) through respective input/output device interfaces (602/702).

Computer instructions for operating each device (410/420/425) and its various components may be executed by the respective device's controller(s)/processor(s) (604/704), using the memory (606/706) as temporary "working" storage at runtime. A device's computer instructions may be stored in a non-transitory manner in non-volatile memory (606/706), storage (608/708), or an external device(s). Alternatively, some or all of the executable instructions may be embedded in hardware or firmware on the respective device in addition to or instead of software.

Each device (410/420/425) includes input/output device interfaces (602/702). A variety of components may be connected through the input/output device interfaces (602/702), as will be discussed further below. Additionally, each device (410/420/425) may include an address/data bus (624/724) for conveying data among components of the respective device. Each component within a device (410/420/425) may also be directly connected to other components in addition to (or instead of) being connected to other components across the bus (624/724).

Referring to FIG. 6, the user device 410 may include input/output device interfaces 602 that connect to a variety of components such as an audio output component such as a speaker 612, a wired headset or a wireless headset (not illustrated), or other component capable of outputting audio. The user device 410 may also include an audio capture component. The audio capture component may be, for example, a microphone 620 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The user device 410 may additionally include a display 616 for displaying content. The user device 410 may further include a camera 618.

Via antenna(s) 622, the input/output device interfaces 602 may connect to one or more networks 499 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 499, the system may be distributed across a networked environment. The I/O device interface (602/702) may also include communication components that allow data to be exchanged between devices such as different physical servers in a collection of servers or other components.

The components of the user device(s) 410, the natural language command processing system component(s), or a skill system component(s) 425 may include their own dedicated processors, memory, and/or storage. Alternatively, one or more of the components of the user device(s) 410, the natural language command processing system component(s), or a skill system component(s) 425 may utilize the I/O interfaces (602/702), processor(s) (604/704), memory (606/706), and/or storage (608/708) of the user device(s) 410, natural language command processing system component(s), or the skill system component(s) 425, respectively. Thus, the ASR component 550 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the user device 410, the natural language command processing system component(s), and a skill system component(s) 425, as described herein, are illustrative, and may be located as a stand-alone device or may be included, in whole or in part, as a component of a larger device or system. As can be appreciated, a number of components may exist either on a system component(s) and/or on user device 410. For example, ASR component 550 and TTS component 556), etc., for example as illustrated in FIG. 5. Unless expressly noted otherwise, the system version of such components may operate similarly to the device version of such components and thus the description of one version (e.g., the system version or the local version) applies to the description of the other version (e.g., the local version or system version) and vice-versa.

Figure 8:
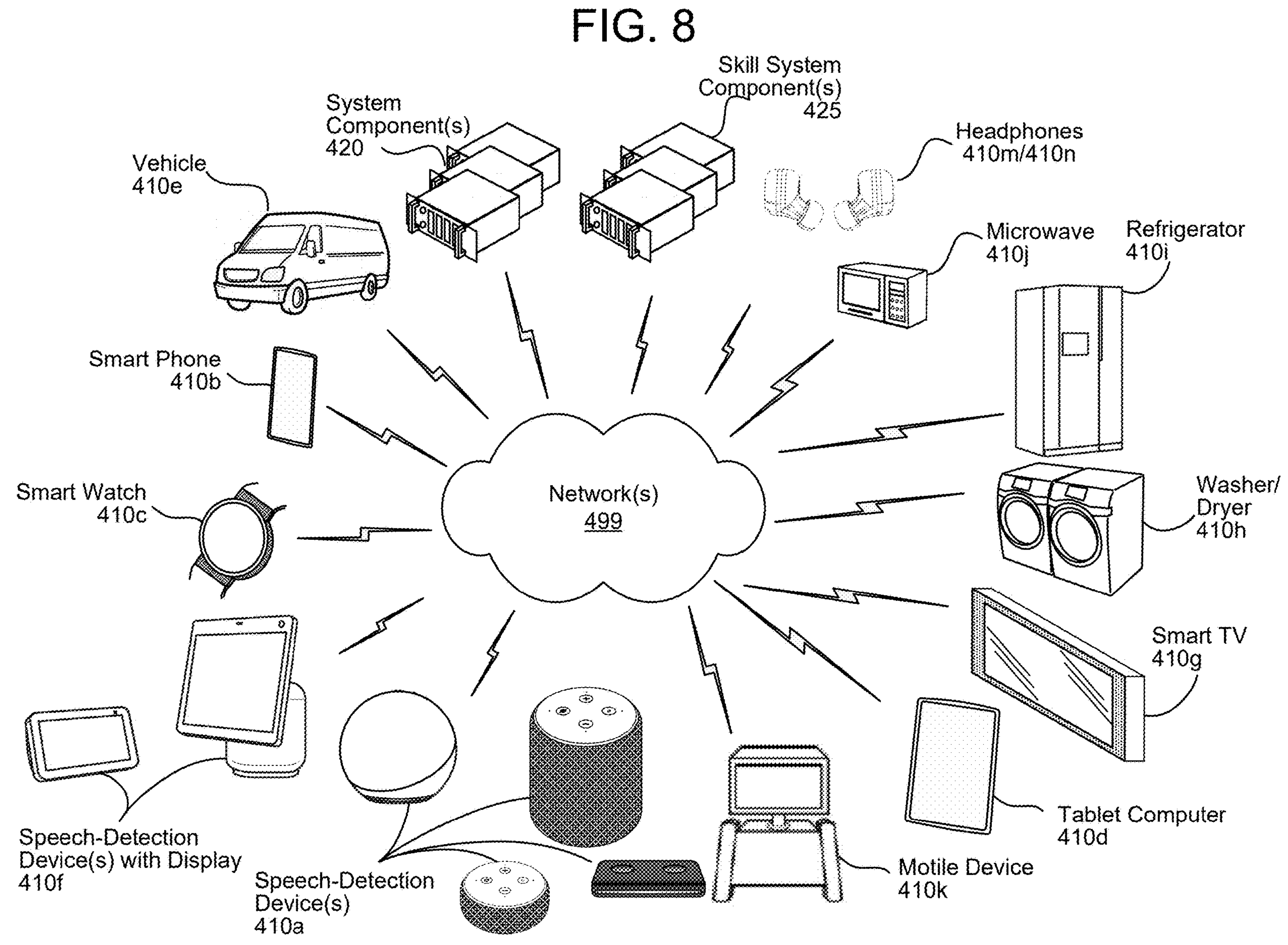
FIG. 8 illustrates an example of a computer network for use with the overall system, according to embodiments of the present disclosure.

As illustrated in FIG. 8, multiple devices (410*a*-410*n*, 420, 425) may contain components of the system and the devices may be connected over a network(s) 499. The network(s) 499 may include a local or private network or may include a wide network such as the Internet. Devices may be connected to the network(s) 499 through either wired or wireless connections. For example, a speech-detection user device 410*a*, a smart phone 410*b*, a smart watch 410*c*, a tablet computer 410*d*, a vehicle 410*e*, a speech-detection device with display 410*f*, a display/smart television 410*g*, a washer/dryer 410*h*, a refrigerator 410*i*, a microwave 410*j*, autonomously motile user device 410*k* (e.g., a robot), etc., may be connected to the network(s) 499 through a wireless service provider, over a Wi-Fi or cellular network connection, or the like. Other devices are included as network-connected support devices, such as the natural language command processing system component(s) 420, the skill system component(s) 425, and/or others. The support devices may connect to the network(s) 499 through a wired connection or wireless connection. Networked devices may capture audio using one-or-more built-in or connected microphones or other audio capture devices, with processing performed by ASR components, NLU components, or other components of the same device or another device connected via the network(s) 499, such as the ASR component 550, etc. of the natural language command processing system component(s) 420.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:

receiving first natural language input data corresponding to a first user input;

processing the first natural language input data using a first version of a first language model to generate first response data responsive to the first user input;

causing presentation of the first response data;

receiving second natural language input data corresponding to a second user input;

receiving first dialog history data including the first natural language input data and the first response data;

processing, using a first machine learning (ML) model, the second natural language input data and the first dialog history data to determine the second user input includes first user-provided feedback associated with the first response data;

based on determining that the second user input includes the first user-provided feedback, processing the second natural language input data and the first dialog history data to generate first prompt data, the first prompt data representing a first natural language directive for a second language model to generate first feedback prompt data instructing the first language model to generate a first response to the first user input based on the first user-provided feedback;

processing, using the second language model, the first prompt data to generate the first feedback prompt data;

processing, using the first version of the first language model, the first feedback prompt data to generate second response data responsive to the first user input and the first user-provided feedback; and using the first natural language input data and the second response data, performing updating of the first version of the first language model to generate a second version of the first language model.

2. The computer-implemented method of claim 1, wherein the first natural language input data and the second natural language input data are associated with a first user, the first user-provided feedback representing a first user preference of the first user, and the method further comprises:

storing the first natural language input data and the second response data in a storage in association with the first user;

receiving third natural language input data corresponding to a third user input, the third natural language input data being associated with the first user;

based on the third natural language input data being associated with the first user, retrieving the first natural language input data and the second response data from the storage;

processing the third natural language input data, the first natural language input data, and the second response data to generate second prompt data, the second prompt data representing a second natural language directive for the first language model to generate third response data responsive to the third natural language input data based on the first natural language input data and the second response data;

processing, using the first language model, the second prompt data to generate the third response data; and causing presentation of the third response data.

3. The computer-implemented method of claim 1, further comprising:

receiving second dialog history data including first previous natural language input data and first previous natural language response data;

processing, using the first ML model, the first natural language input data and the second dialog history data to determine the first natural language input data includes a new user request, instead of user-provided feedback;

based on determining the first natural language input data includes a new user request, instead of user-provided feedback, processing the first natural language input data and the second dialog history data to generate second prompt data corresponding to second natural language directive for the first language model to generate the first response data; and processing the second prompt data using the first version of the first language model to generate the first response data.

4. The computer-implemented method of claim 1, further comprising:

determining a frequency with which user-provided feedback similar to the first user-provided feedback has been received;

based on the frequency, determining the first user-provided feedback satisfies a criteria;

based on determining the first user-provided feedback satisfies the criteria, determining a training data set including the first natural language input data and the second response data; and using the training data set, performing supervised fine-tuning of the first version of the first language model to generate the second version of the first language model, wherein the second version of the first language model is configured to generate third response data associated with the first user-provided feedback in response to receiving third natural language response data corresponding to a third user input, the third user input being associated with the first user input.

5. A computer-implemented method comprising:

receiving first input data corresponding to a first user input;

receiving first history data including first prior input data and first response data responsive to the first prior input data, the first prior input data received prior to the first input data;

processing the first input data and the first history data to determine the first user input includes first user-provided feedback associated with the first response data;

based on determining that the first user input includes the first user-provided feedback, processing the first input data and the first history data to generate first prompt data;

processing, using a first version of a first language model, the first prompt data to generate second response data responsive to the first prior input data and the first user-provided feedback; and using the first prior input data and the second response data, performing updating of the first version of the first language model to generate a second version of the first language model.

6. The computer-implemented method of claim 5, wherein the first input data and the first prior input data are associated with a first user, the first user-provided feedback representing a first user preference of the first user, and the method further comprises:

storing the first prior input data and the first response data in a storage in association with the first user, wherein the first prior input data and the first response data are usable by the first language model to generate third response data associated with the first user preference in response to receiving second input data associated with the first prior input data and the first user.

7. The computer-implemented method of claim 5, further comprising:

receiving second history data including second prior input data and first prior response data;

processing the first prior input data and the second history data to determine the first input data includes a new user request, instead of user-provided feedback;

based on determining the first prior input data includes a new user request, instead of user-provided feedback, processing the first prior input data and the second history data to generate second prompt data, the second prompt data corresponding to a second natural language directive for the first language model to generate a second response to the first prior input data;

processing, using the first version of the first language model, the second prompt data to generate the second response data responsive to the first prior input data; and causing presentation of the second response data.

8. The computer-implemented method of claim 5, further comprising:

determining a frequency with which user-provided feedback similar to the first user-provided feedback has been received;

based on the frequency, determining the first user-provided feedback satisfies a criteria;

based on determining the first user-provided feedback satisfies the criteria, determining training data set including the first prior input data and the second response data; and using the training data set, performing supervised fine-tuning of the first version of the first language model to generate the second version of the first language model, wherein the second version of the first language model is configured to generate third response data associated with the first user-provided feedback in response to receiving second input data associated with the first prior input data.

9. The computer-implemented method of claim 5, wherein processing the first input data and the first history data to determine the first user input includes the first user-provided feedback comprises:

using the first input data, determining, in a storage, second input data determined to include second user-provided feedback, the second input data being associated with the first input data; and based on retrieving the second input data, determining the first user input includes the first user-provided feedback.

10. The computer-implemented method of claim 5, further comprising:

receiving second input data corresponding to a second user input;

receiving second history data including second prior input data and first prior response data responsive to the second prior input data;

processing the second input data and the second history data to determine the second user input includes second user-provided feedback associated with the first prior response data;

based on determining that the second user input includes the second user-provided feedback and using the second input data, retrieving, from a storage, second prompt data associated with third input data corresponding to a third user input determined to include third user-provided feedback, the third input data being associated with the second input data;

processing, using the second version of the first language model, the second prompt data to generate third response data responsive to the second prior input data and the second user-provided feedback; and using the second prior input data and the third response data, performing updating of the second version of the first language model to generate a third version of the first language model.

11. The computer-implemented method of claim 5, wherein processing the first input data and the first history data to determine the first user input includes the first user-provided feedback comprises processing, by a classifier, the first input data and the first history data, and the method further comprises:

determining a training data set including:

second input data including second user feedback associated with a verbosity of first prior response data, third input data including third user feedback associated with a naturalness of second prior response data, fourth input data including fourth user feedback associated with an accuracy of third prior response data, and fifth input data including fifth user feedback associated with comprehensiveness of a fourth prior response data;

using the training data set, performing updating of a first version of the classifier to generate a second version of the classifier; and processing, using the second version of the classifier, the first input data and the first history data to determine the first user input includes the first user-provided feedback.

12. The computer-implemented method of claim 5, further comprising:

based on the first input data, determining first example data, the first example data including a third input data and third response data responsive to the third input data, the third input data being semantically similar to the first input data; and processing the first input data, the first history data, and the first example data to generate the first prompt data.

13. A computing system comprising:

at least one processor; and at least one memory comprising instructions that, when executed by the at least one processor, cause the computing system to:

receive first input data corresponding to a first user input;

receive first history data including first prior input data and first response data responsive to the first prior input data, the first prior input data received prior to the first input data;

process the first input data and the first history data to determine the first user input includes first user-provided feedback associated with the first response data;

based on determining that the first user input includes the first user-provided feedback, process the first input data and the first history data to generate first prompt data;

process, using a first version of a first language model, the first prompt data to generate second response data responsive to the first prior input data and the first user-provided feedback; and use the first prior input data and the second response data, performing updating of the first version of the first language model to generate a second version of the first language model.

14. The computing system of claim 13, wherein the first input data and the first prior input data are associated with a first user, the first user-provided feedback representing a first user preference of the first user, and wherein the at least one memory further comprises instructions that, when executed by the at least one processor, further cause the computing system to:

store the first prior input data and the first response data in a storage in association with the first user, wherein the first prior input data and the first response data are usable by the first language model to generate third response data associated with the first user preference in response to receiving second input data associated with the first prior input data and the first user.

15. The computing system of claim 13, wherein the at least one memory further comprises instructions that, when executed by the at least one processor, further cause the computing system to:

receive second history data including second prior input data and first prior response data;

process the first prior input data and the second history data to determine the first input data includes a new user request, instead of user-provided feedback;

based on determining the first prior input data includes a new user request, instead of user-provided feedback, process the first prior input data and the second history data to generate second prompt data, the second prompt data corresponding to a second natural language directive for the first language model to generate a second response to the first prior input data;

process, using the first version of the first language model, the second prompt data to generate the second response data responsive to the first prior input data; and cause presentation of the second response data.

16. The computing system of claim 13, wherein the at least one memory further comprises instructions that, when executed by the at least one processor, further cause the computing system to:

determine a frequency with which user-provided feedback similar to the first user-provided feedback has been received;

based on the frequency, determine the first user-provided feedback satisfies a criteria;

based on determining the first user-provided feedback satisfies the criteria, determine training data set including the first prior input data and the second response data; and use the training data set, performing supervised fine-tuning of the first version of the first language model to generate the second version of the first language model, wherein the second version of the first language model is configured to generate third response data associated with the first user-provided feedback in response to receiving second input data associated with the first prior input data.

17. The computing system of claim 13, wherein the instructions that cause the computing system to process the first input data and the first history data to determine the first user input includes the first user-provided feedback comprise further instructions that, when executed by the at least one processor, further cause the computing system to:

use the first input data, determining, in a storage, second input data determined to include second user-provided feedback, the second input data being associated with the first input data; and based on retrieving the second input data, determine the first user input includes the first user-provided feedback.

18. The computing system of claim 13, wherein the at least one memory further comprises instructions that, when executed by the at least one processor, further cause the computing system to:

receive second input data corresponding to a second user input;

receive second history data including second prior input data and first prior response data responsive to the second prior input data;

process the second input data and the second history data to determine the second user input includes second user-provided feedback associated with the first prior response data;

based on determining that the second user input includes the second user-provided feedback and using the second input data, retrieve, from a storage, second prompt data associated with third input data corresponding to a third user input determined to include third user-provided feedback, the third input data being associated with the second input data;

process, using the second version of the first language model, the second prompt data to generate third response data responsive to the second prior input data and the second user-provided feedback; and using the second prior input data and the third response data, perform updating of the second version of the first language model to generate a third version of the first language model.

19. The computing system of claim 13, wherein the instructions that cause the computing system to process the first input data and the first history data to determine the first user input include further instructions that, when executed by the at least one processor, further cause the computing system to process, by a classifier, the first input data and the first history data, and wherein the at least one memory further comprises instructions that, when executed by the at least one processor, further cause the computing system to:

determine a training data set including:

second input data including second user feedback associated with a verbosity of first prior response data, third input data including third user feedback associated with a naturalness of second prior response data, fourth input data including fourth user feedback associated with an accuracy of third previous prior data, and fifth input data including fifth user feedback associated with comprehensiveness of a fourth prior response data;

using the training data set, perform updating of a first version of the classifier to generate a second version of the classifier; and process, using the second version of the classifier, the first input data and the first history data to determine the first user input includes the first user-provided feedback.

20. The computing system of claim 13, wherein the at least one memory further comprises instructions that, when executed by the at least one processor, further cause the computing system to:

based on the first input data, determine first example data, the first example data including a third input data and third response data responsive to the third input data, the third input data being semantically similar to the first input data; and process the first input data, the first history data, and the first example data to generate the first prompt data.

* * * * *